(12) United States Patent
Park et al.

(10) Patent No.: US 10,185,390 B2
(45) Date of Patent: Jan. 22, 2019

(54) HEAD MOUNTED DISPLAY WITH SEPARATE WIRE CONNECTED CONTROLLER

(71) Applicant: LG ELECTRONICS INC., Seoul (KR)

(72) Inventors: Cheongha Park, Seoul (KR); Goeun Joo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 72 days.

(21) Appl. No.: 15/214,096

(22) Filed: Jul. 19, 2016

(65) Prior Publication Data
US 2017/0115728 A1 Apr. 27, 2017

(30) Foreign Application Priority Data
Oct. 26, 2015 (KR) .................. 10-2015-0148969

(51) Int. Cl.
| | |
|---|---|
| *G06F 3/01* | (2006.01) |
| *G02B 27/00* | (2006.01) |
| *G02B 27/01* | (2006.01) |
| *G06F 3/041* | (2006.01) |
| *G06F 3/0481* | (2013.01) |
| *G06F 3/0482* | (2013.01) |

(Continued)

(52) U.S. Cl.
CPC .......... *G06F 3/012* (2013.01); *G02B 27/0093* (2013.01); *G02B 27/017* (2013.01); *G06F 3/011* (2013.01); *G06F 3/013* (2013.01); *G06F 3/017* (2013.01); *G06F 3/041* (2013.01); *G06F 3/0481* (2013.01); *G06F 3/0482* (2013.01); *G06F 3/0487* (2013.01); *G06F 3/0488* (2013.01); *G06F 3/04883* (2013.01); *G06T 3/40* (2013.01); *G06T 3/60* (2013.01); *G06T 19/006* (2013.01); *H04M 1/7253* (2013.01)

(58) Field of Classification Search
None
See application file for complete search history.

(56) References Cited

U.S. PATENT DOCUMENTS

| | | | |
|---|---|---|---|
| 9,442,631 B1 * | 9/2016 | Patel | G06F 3/0482 |
| 2014/0152558 A1 | 6/2014 | Salter et al. | |

(Continued)

OTHER PUBLICATIONS

European Patent Office Application Serial No. 16002134.1, Search Report dated Apr. 5, 2017, 7 pages.

*Primary Examiner* — Edward Martello
(74) *Attorney, Agent, or Firm* — Lee Hong Degerman Kang & Waimey

(57) ABSTRACT

A system includes a head mounted display (HMD) having at least one of a display unit and a sensing unit and configured to be connected to a mobile terminal in a wired manner, and a mobile terminal configured to control the HMD, wherein the mobile terminal includes a terminal body, an interface unit provided in the terminal body and configured to be connected to the HMD in a wired manner, a sensing unit configured to sense a movement of the terminal body, and a controller configured to output a preset first region of a virtual space on the display unit of the HMD and control the display unit of the HMD to display a second region of the virtual space different from the first region of the virtual space on the basis of a movement of the HMD sensed through the sensing unit of the HMD.

13 Claims, 17 Drawing Sheets

(51) Int. Cl.
*G06F 3/0488* (2013.01)
*G06T 3/40* (2006.01)
*G06T 3/60* (2006.01)
*G06T 19/00* (2011.01)
*G06F 3/0487* (2013.01)
*H04M 1/725* (2006.01)

(56) References Cited

U.S. PATENT DOCUMENTS

2014/0225920 A1   8/2014  Murata et al.
2015/0062164 A1*  3/2015  Kobayashi ............ G06T 19/006
                                                      345/633

* cited by examiner

FIG. 5A
(a)
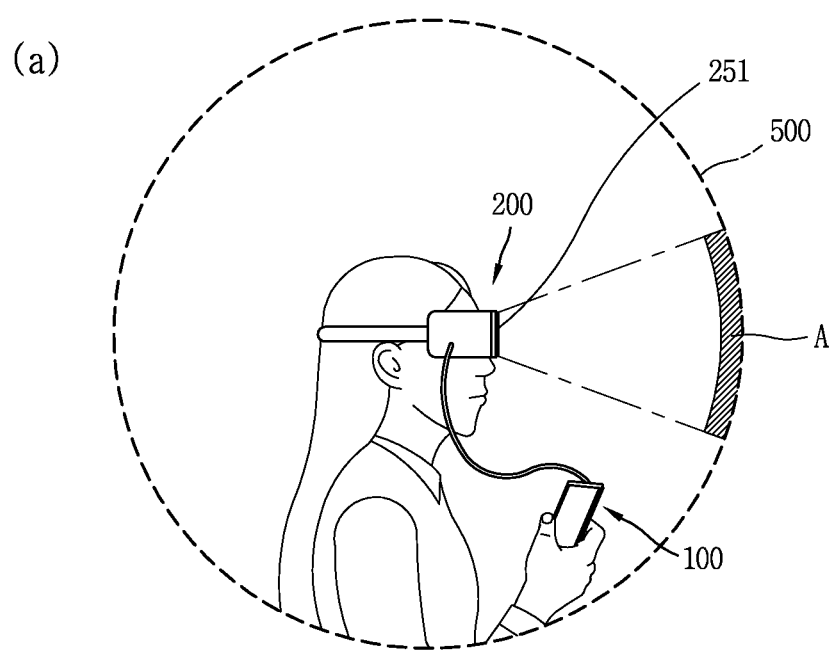
(b)
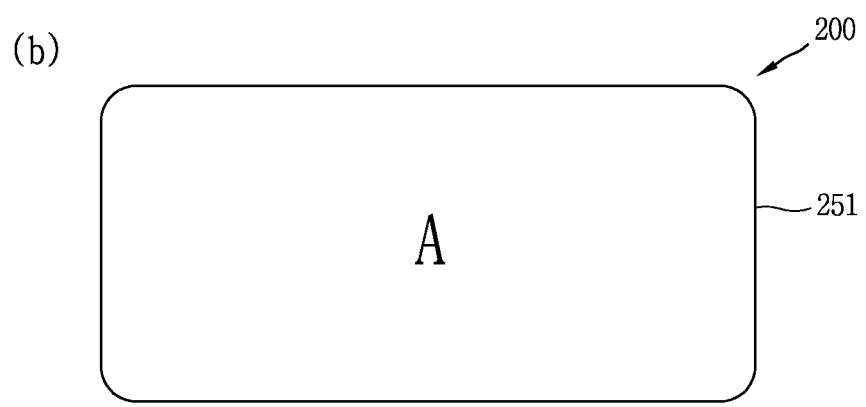

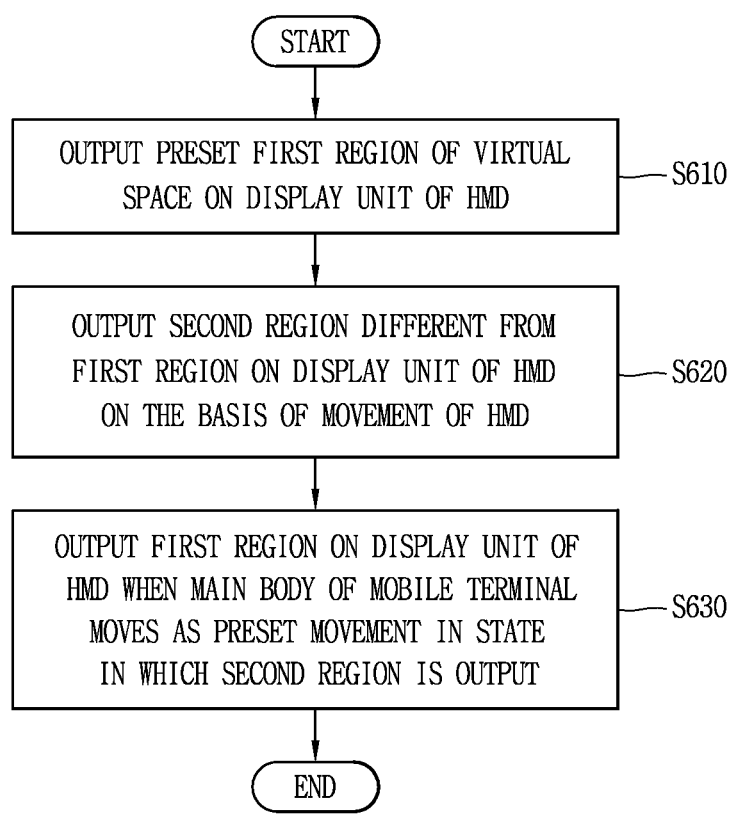

FIG. 7
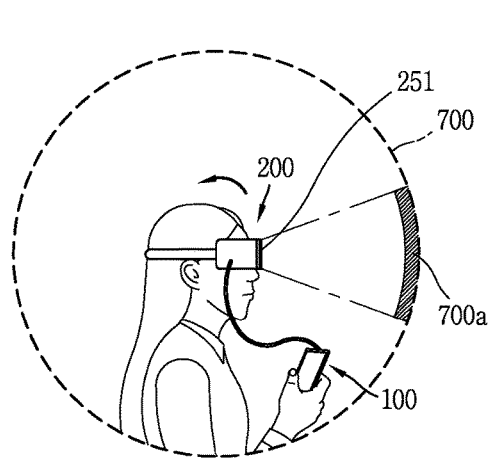
(a)
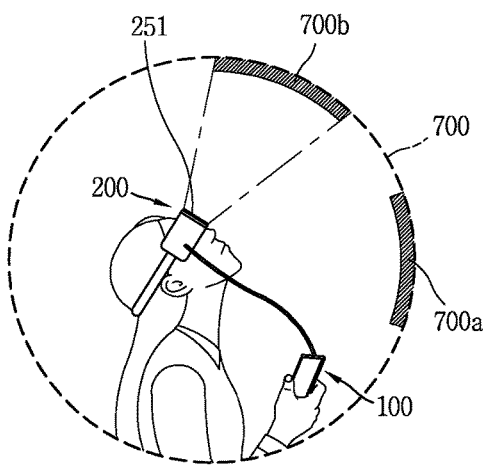
(b)
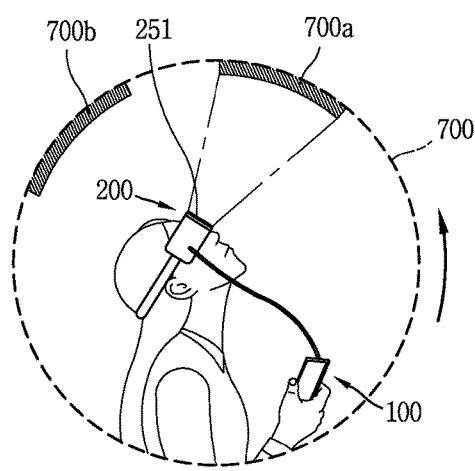
(d)
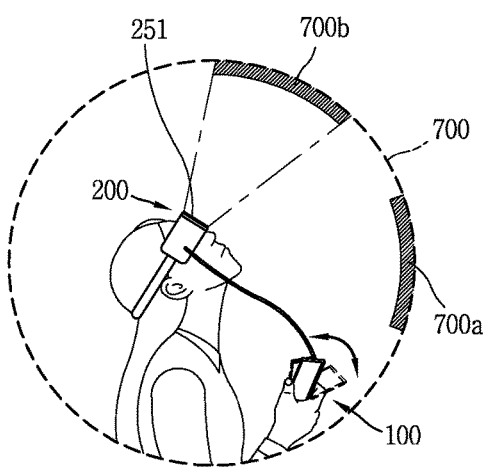
(c)

FIG. 10
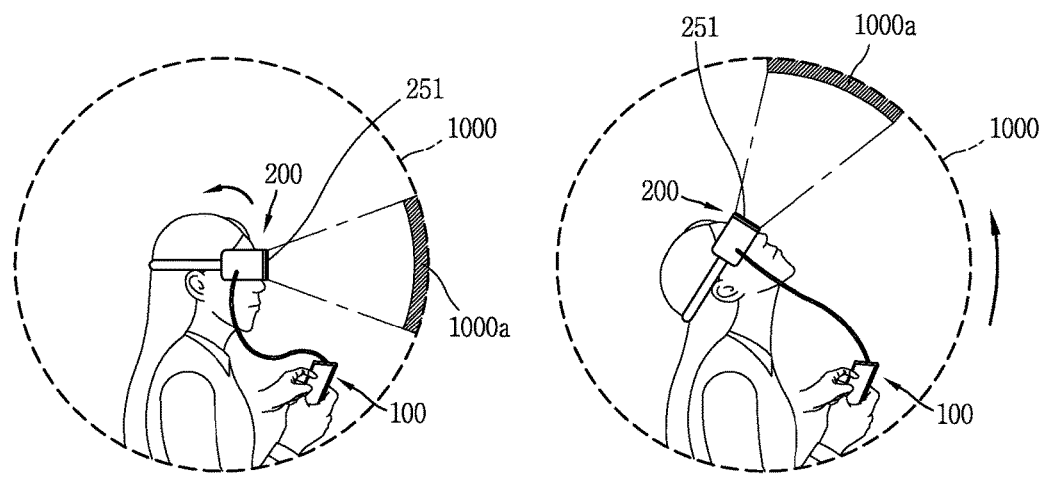
(a)  (b)
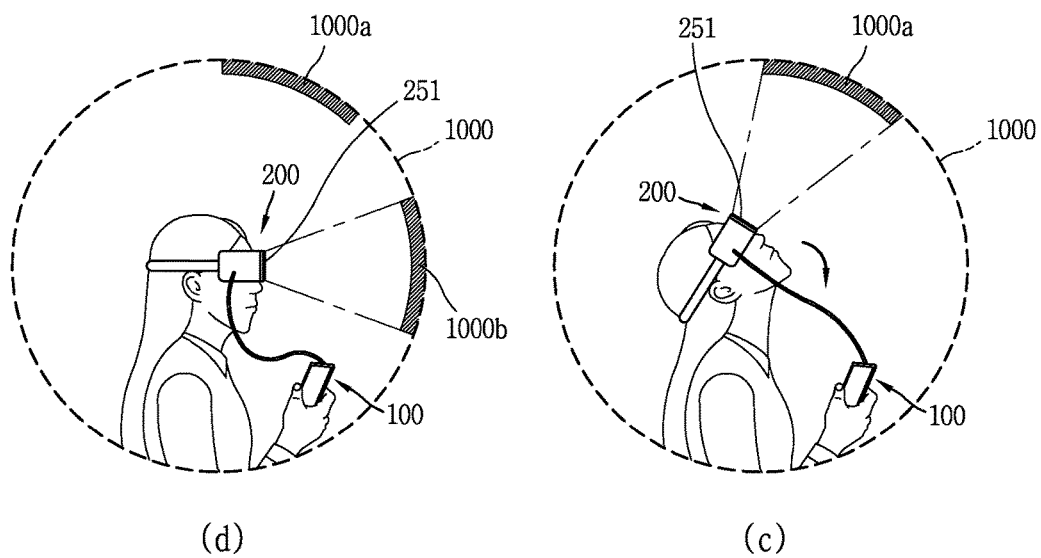
(d)  (c)

FIG. 11A
(a)
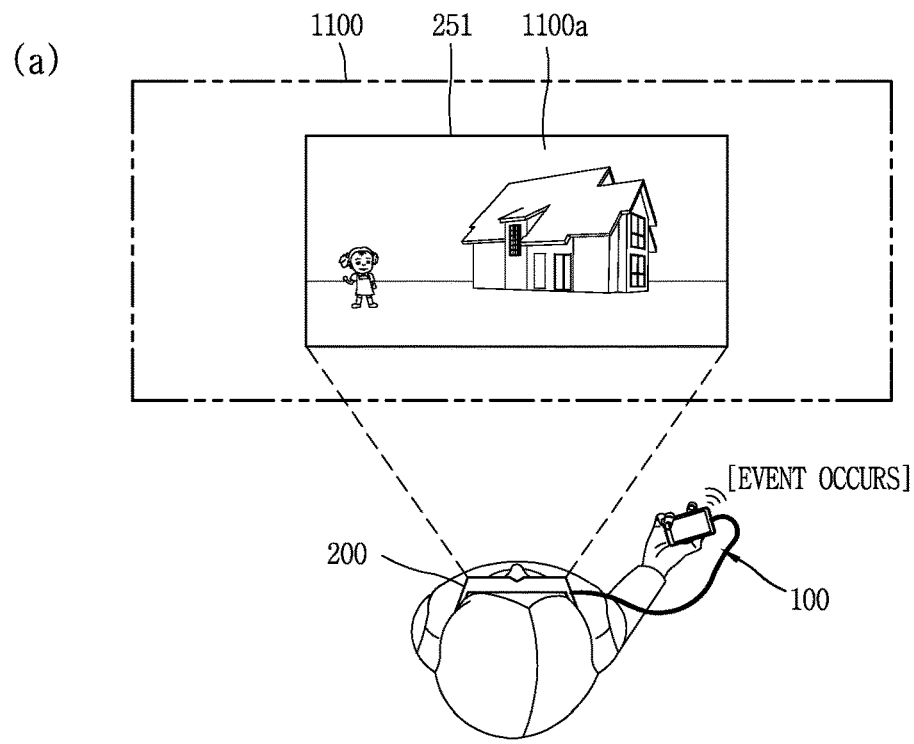
(b)
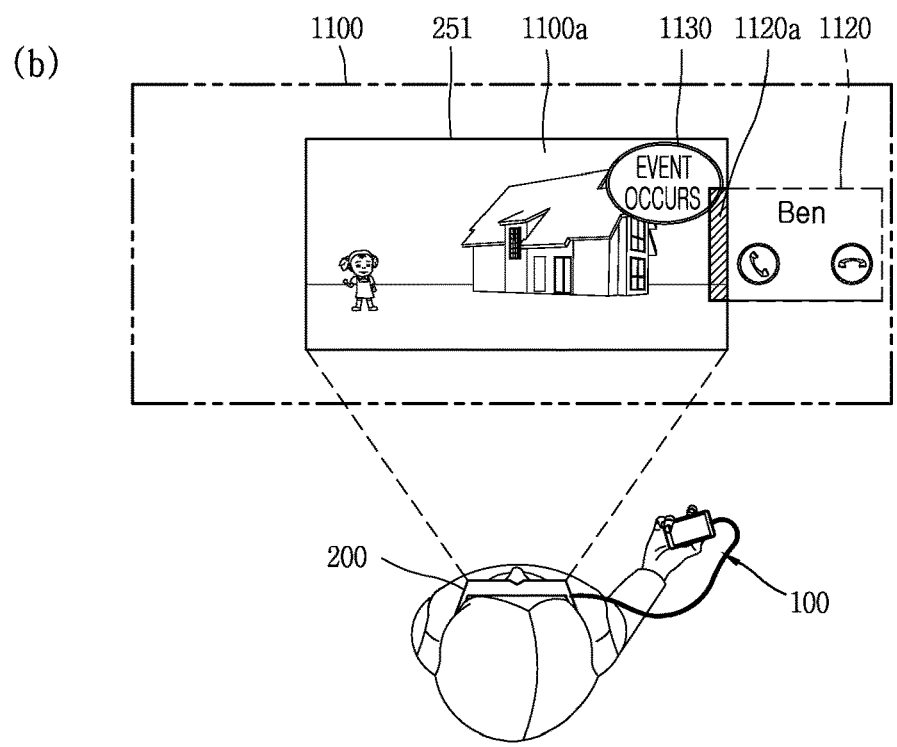

FIG. 11B
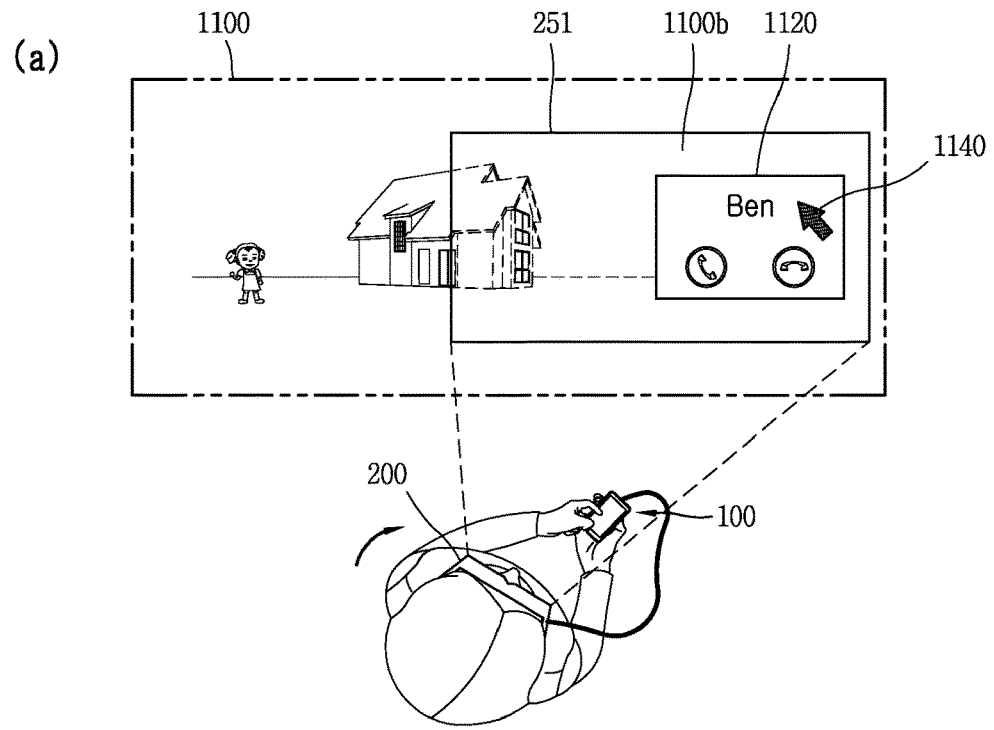
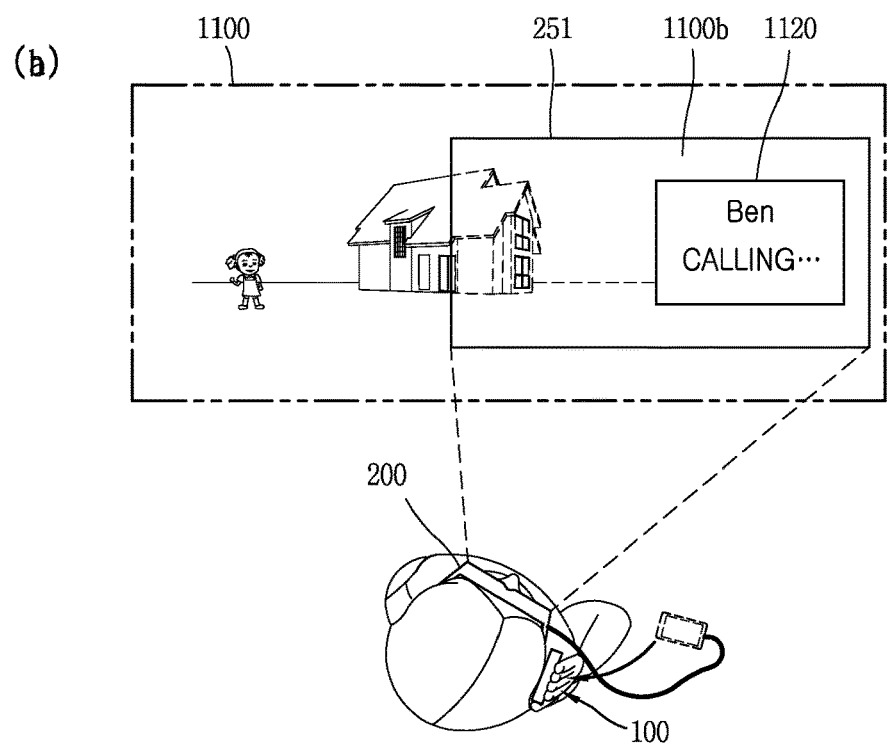

HEAD MOUNTED DISPLAY WITH SEPARATE WIRE CONNECTED CONTROLLER

CROSS-REFERENCE TO RELATED APPLICATION

Pursuant to 35 U.S.C. § 119(a), this application claims the benefit of earlier filing date and right of priority to Korean Application No. 10-2015-0148969, filed on Oct. 26, 2015, the contents of which are all hereby incorporated by reference herein in its entirety.

BACKGROUND OF THE INVENTION

1. Field of the Invention

The present disclosure relates to a system including a mobile terminal capable of controlling a head-mounted display (HMD), and a method of controlling the same.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. More recently, mobile terminals have been configured to receive broadcast and multicast signals which permit viewing of content such as videos and television programs.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Recently, wearable glass type terminals configured to be mounted on part of a human body have been developed. A glass type terminal mounted on a user's head may be a head-mounted display (HMD).

The head-mounted display (HMD) refers to various display devices that may be worn on a user's head, like glasses, to allow the user to view an image (content). As digital devices have been reduced in weight and size, various wearable computers have been developed, and an HMD is also widely used.

A display device provided in a glass type terminal such as an HMD may be combined with an augmented reality technology, N screen technology, and the like, beyond a simple image output function, to provide various user convenience.

In order to support and increase functions of the terminals and HMDs, improvement of structural part and/or software part of a terminal and a structural part and/or software part of an HMD may be considered.

SUMMARY OF THE INVENTION

Therefore, an aspect of the detailed description is to provide a system for controlling a head mounted display (HMD) through a mobile terminal in an optimized manner, and a method for controlling the same.

Another aspect of the detailed description is to provide a system for controlling screen information that can be output on an HMD using a mobile terminal, and a method for controlling the same.

To achieve these and other advantages and in accordance with the purpose of this specification, as embodied and broadly described herein, a system including a mobile terminal and a head mounted display (HMD) includes: an HMD having at least one of a display unit and a sensing unit and configured to be connected to the mobile terminal in a wired manner; and a mobile terminal configured to control the HMD, wherein the mobile terminal includes: a terminal body; an interface unit provided in the terminal body and configured to be connected to the HMD in a wired manner; a sensing unit configured to sense a movement of the terminal body; and a controller configured to output a preset first region of a virtual space on the display unit of the HMD and control the display unit of the HMD to display a second region of the virtual space different from the first region of the virtual space on the basis of a movement of the HMD sensed through the sensing unit of the HMD, wherein in a state in which the second region is output on the display unit of the HMD, when a movement of the terminal body corresponds to a preset movement, the controller outputs the preset first region, instead of the second region, on the display unit of the HMD with respect to a current posture of the HMD.

In an exemplary embodiment of the present disclosure, when the terminal body is moved as the preset movement in a state in which the second region is output, the controller may output the preset first region on the display unit of the HMD even though a movement of the HMD is not sensed.

In an exemplary embodiment of the present disclosure, the controller may relatively rotate the virtual space with respect to the HMD such that the preset first region is output on the display unit of the HMD in response to the preset movement.

In an exemplary embodiment of the present disclosure, the preset first region may be at least one of a default region of the virtual space, a region including a specific object among objects included in the virtual space, and a specific region set by a user.

In an exemplary embodiment of the present disclosure, a movement of the HMD may be sensed by using the sensing unit provided in the mobile terminal.

To achieve these and other advantages and in accordance with the purpose of this specification, as embodied and broadly described herein, a system including a mobile terminal and a head mounted display (HMD) includes: an HMD having at least one of a display unit, a sensing unit, and a user input unit and configured to be connected to the mobile terminal in a wired manner; and a mobile terminal configured to control the HMD, wherein the mobile terminal includes: an interface unit configured to be connected to the HMD in a wired manner; a touch screen; and a controller configured to, when the HMD is moved in a state in which a user input applied to at least one of a touch screen of the mobile terminal and the user input unit of the HMD is maintained in a state in which one portion of a virtual space is output on the display unit of the HMD, maintain output of the one portion of the virtual space on the display unit of the HMD.

In an exemplary embodiment of the present disclosure, when the HMD is moved in a state in which a user input is not applied to the touch screen and the user input unit, the controller may output a portion of the virtual space different from the one portion of the virtual space on the display unit of the HMD.

In an exemplary embodiment of the present disclosure, the system may further include: a wireless communication unit, wherein when an event occurs through the wireless communication unit, the controller may form event information related to the event in the virtual space, and at least a portion of the event information may be displayed on the display unit of the HMD in order to inform about the occurrence of the event.

In an exemplary embodiment of the present disclosure, in a state in which one portion of the event information is output on the display unit of the HMD, when the HMD is rotated in a direction in which the event information is formed, a size of the one portion of the event information output on the display unit of the HMD may be increased.

In an exemplary embodiment of the present disclosure, in a state in which the event information is output on the display unit of the HMD, when the terminal body is moved as a specific movement, the controller may perform an operation related to the event.

In an exemplary embodiment of the present disclosure, the sensing unit of the HMD may sense eyes of the user who wears the HMD and the virtual space may include at least one graphic object associated with a preset function, wherein when it is sensed that the user gazes at any one of the at least one graphic object, the controller may perform a function associated with the any one graphic object.

In an exemplary embodiment of the present disclosure, a selection window for selecting any one of at least two operations may be output on the display unit of the HMD, and when the terminal body is moved in a state in which the selection window is output, the controller may perform any one of the at least two operations on the basis of a direction in which the terminal body is moved.

In an exemplary embodiment of the present disclosure, when the terminal body is moved in a first direction, the controller may perform a first operation, and when the terminal body is moved in a second direction different from the first direction, the controller may perform a second operation different from the first operation.

To achieve these and other advantages and in accordance with the purpose of this specification, as embodied and broadly described herein, a method for controlling a system including a mobile terminal and a head mounted display (HMD) includes: outputting, by the mobile terminal, a preset first region of a virtual space on a display unit of the HMD connected to the mobile terminal in a wired manner; outputting, by the mobile terminal, a second region of the virtual space different from the first region of the virtual space on the display unit of the HMD on the basis of a movement of the HMD; and when a movement of a terminal body of the mobile terminal corresponds to a preset movement in a state in which the second region is output on the display unit of the HMD, controlling, by the mobile terminal, the HMD to output the preset first region, instead of the second region, on the display unit of the HMD with respect to a current posture of the HMD.

In an exemplary embodiment of the present disclosure, in the controlling, when the terminal body is moved as the preset movement in a state in which the second region is output, the mobile terminal may output the preset first region on the display unit of the HMD even though a movement of the HMD is not sensed.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 5A and 5B are conceptual views illustrating a virtual space related to an embodiment of the present disclosure.

FIG. 6 is a flow chart illustrating a representative control method according to an embodiment of the present disclosure.

FIGS. 7 and 8 are conceptual views illustrating the control method of FIG. 6.

FIG. 10 is a conceptual view illustrating the control method of FIG. 9.

FIGS. 11A, 11B, 12A, 12B, and 13 are conceptual views illustrating a method for controlling an HMD using a mobile terminal according to another embodiment of the present disclosure.

DETAILED DESCRIPTION OF THE INVENTION

Figure 1A:
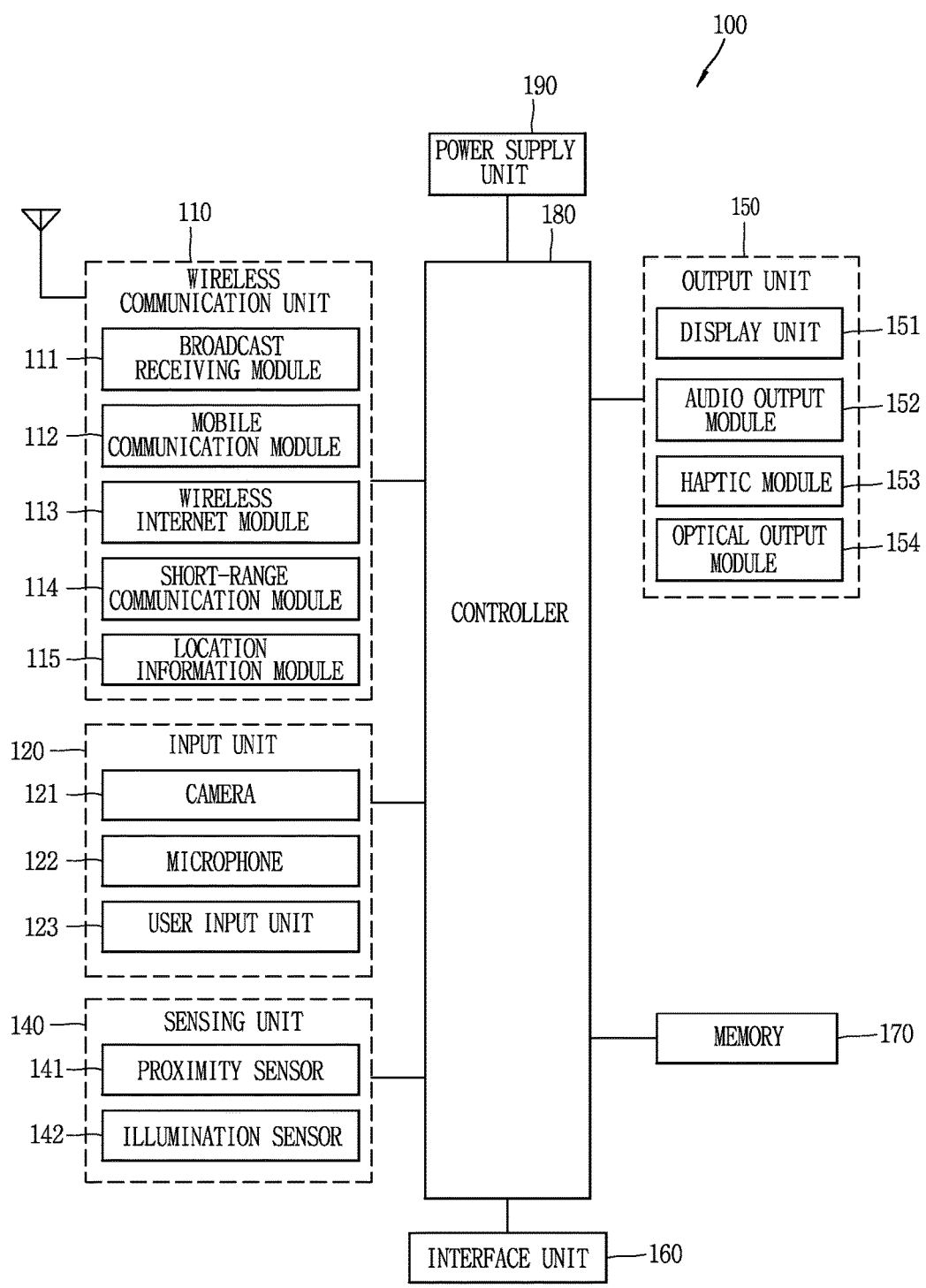
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
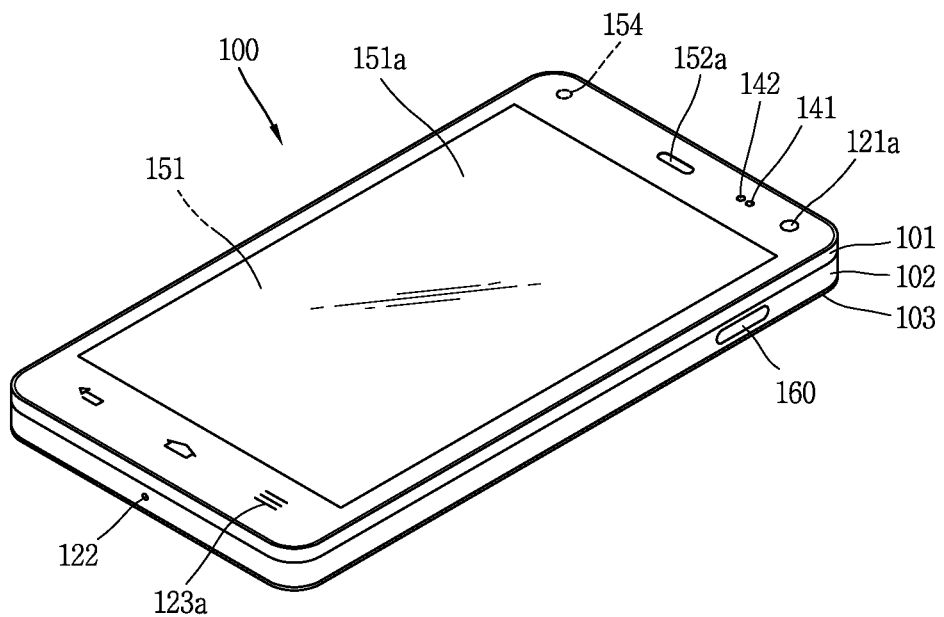
FIGS. 1B and 1C are conceptual views of one example of the mobile terminal, viewed from different directions.
Figure 1C:
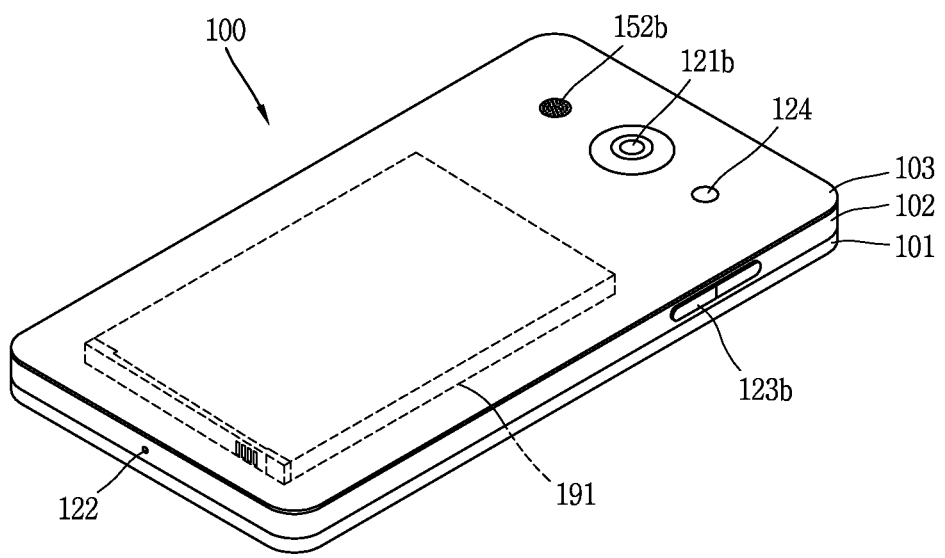

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a control unit 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1A, or activating application programs stored in the memory 170. As one example, the control unit 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the control unit 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The control unit 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which region of the display unit 151 has been touched. Here, the touch controller may be a component separate from the control unit 180, the control unit 180, and combinations thereof.

In some embodiments, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

A left image and a right image required for implementing a 3D stereoscopic image is displayed on the stereoscopic display unit 152 by a stereoscopic processing unit 152a. The stereoscopic processing unit may receive the 3D image and extract the left image and the right image, or may receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the control unit. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 10, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 10 depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 10, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, beyond a level at which a user holds a mobile terminal in hand to use it, a mobile terminal may extend to a wearable device that can be worn on a human body. The wearable device may include a smart watch, a smart glass, a head mounted display (HMD), and the like. Hereinafter, examples of a mobile terminal extending to a wearable device will be described.

A wearable device may be configured to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

A head mounted display (HMD), among wearable devices related to the present disclosure will be described in detail with reference to the accompanying drawings.

Figure 2A:
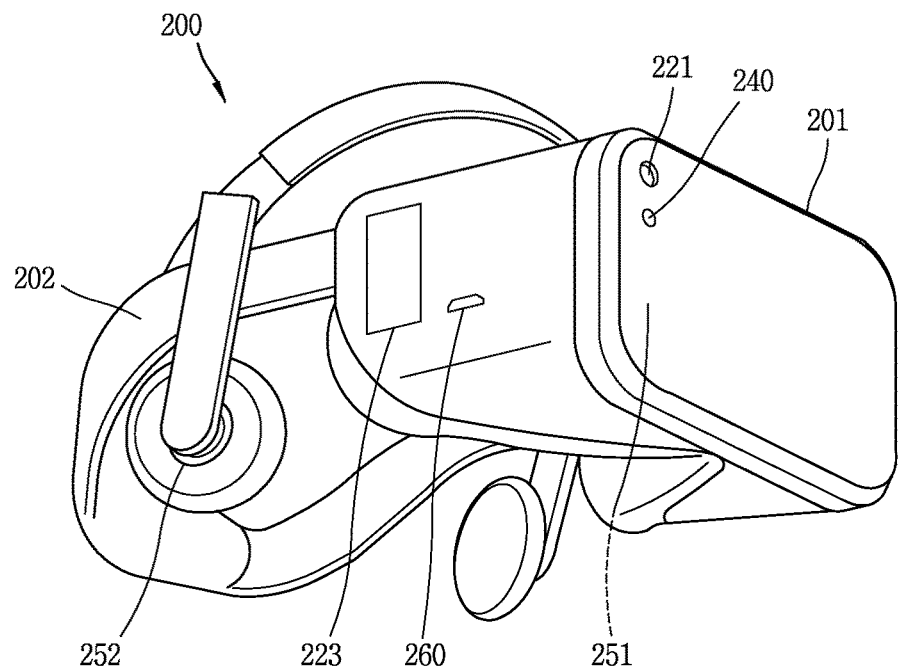
FIGS. 2A and 2B are conceptual views illustrating a head mounted display (HMD) related to an embodiment of the present disclosure.
Figure 2B:
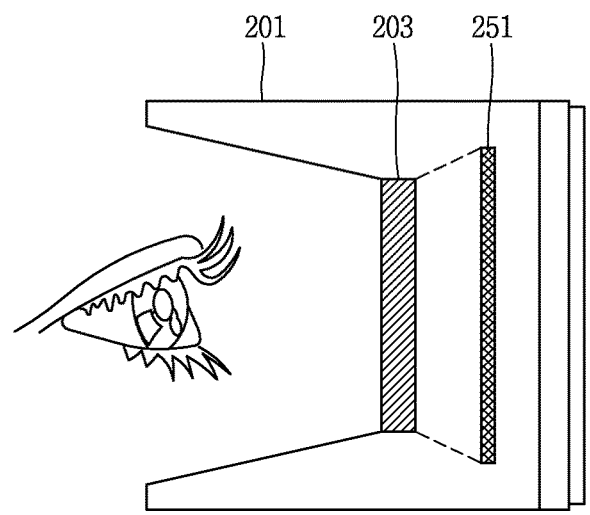

FIGS. 2A and 2B are conceptual views illustrating a head mounted display (HMD) related to an embodiment of the present disclosure.

An HMD 200 related to the present disclosure may include at least one of the elements described above with reference to FIG. 1A.

For example, the HMD 200 may include at least one of a wireless communication unit, an input unit (for example, a user input unit 223, a microphone, etc.), a sensing unit 240, an output unit (for example, a display unit 251 and an audio output unit 252), an interface unit 260, a memory, a controller, and a power supply unit. The components illustrated in FIG. 2A is not essential in implementing the HMD, and thus, the HMD 200 described in the present disclosure may have fewer or greater components.

Referring to FIG. 2A, the HMD 200 related to the present disclosure is formed to be worn on a use's head (or face), and to this end, the HMD 200 may include a frame unit (a case, a housing, and a cover, etc.). The frame unit may be formed of a flexible material so as to be easily worn on a user's head. In the drawing, it is illustrated that the frame unit includes a first frame 201 and a second frame 202 which are formed of different materials.

For example, the first frame 201 may serve to provide a space in which at least one of the components described above with reference to FIG. 1A, and the second frame 102 may serve to support (or fix) the first frame 101 to be mounted on a user's head.

The frame unit may be termed a main body (or an HMD main body) or a body (or an HMD body). Here, the HMD main body (or the HMD body) may be understood as having a concept designating the HMD 200 considered as a single assembly. Hereinafter, the same reference numeral 200 will be used to denote the HMD main body.

When the frame unit including the first frame 201 and the second frame 202 is considered as a single HMD, the main body of the HMD related to the present disclosure may be formed to have various shapes. In detail, the main body may include a plurality of planes at predetermined angles. The plurality of planes may refer to planes positioned on an outer side of the main body of the HMD 200. From this viewpoint, the plurality of planes may refer to surfaces (an external surface or an outer surface) of the HMD 200. Each of the plurality of planes may be flat or curved.

The main body (frame unit) may be supported on a head part and provide a space in which various components are installed. As illustrated, electronic components such as a camera 221, the display unit, the user input unit 223, a controller 280, the sensing unit 240, the interface unit 260, and the like, may be mounted on the first frame 201.

An electronic component such as the audio output unit 252 may be mounted on the second frame 202. However, the present disclosure is not limited thereto and the components described above with reference to FIG. 1A and the components required for the HMD may be variously disposed in first frame 201 and the second frame 202 according to a user selection. That is, the HMD 200 described in the present disclosure may have fewer or greater elements than those enumerated above.

The controller 280 of the HMD is configured to control various electronic components provided in the HMD 200. The controller 280 may be understood as a component corresponding to the controller 180 described above with reference to FIG. 1A.

As illustrated in FIG. 2A, the camera 221 may be provided on the main body 200. For example, the camera 221 may be disposed on one surface (for example, a front surface) of the HMD main body 200. The camera 221 may be disposed to be adjacent to at least one of a left eye and a right eye to capture (receive or input) an image of a front side. The camera 221 may obtain a scene that the user is viewing, as an image.

In the drawing, it is illustrated that only a single camera 221 is provided, but the present disclosure is not limited thereto. That is, a plurality of cameras 221 may be provided to obtain a stereoscopic image.

The HMD 200 may have the sensing unit 240. As described above with reference to FIG. 1A, the sensing unit 240 may include a proximity sensor, an illumination sensor, a touch sensor, an acceleration sensor, a magnetic sensor, a G-sensor, a gyroscope sensor, a motion sensor, an RGB sensor, an infrared (IR) sensor, a fingerprint sensor (or a finger scan sensor), an ultrasonic sensor, an optical sensor (for example, the camera 221), the microphone 122, a battery gauge, an environmental sensor (for example, a barometer, a hygrometer, a thermometer, a radiation sensor, a heat sensor, a gas sensor, etc.), a chemical sensor (for example, an electronic nose, a healthcare sensor, a biometric sensor, etc.), and the like.

For example, the controller 280 may sense movement of the HMD 200 by using the gyroscope sensor, the G-sensor, the motion sensor, and the like, included in the sensing unit 240. In another example, the controller 280 may sense an object which comes to the HMD main body by using the proximity sensor, the illumination sensor, the magnetic sensor, the infrared sensor, the ultrasonic sensor, the optical sensor, and the like, included in the sensing unit 240.

The HMD 200 may have the user input unit 223 operated to receive a control command. The user input unit 223 may employ any tactile method that allows the user to perform manipulation such as touch, push, or the like. In the drawing, it is illustrated that the user input unit 223 based on a push and touch input method is provided in the frame unit.

Also, the HMD 200 may have a microphone (not shown) receiving a sound and processing the received sound into electrical voice data and the audio output unit 252 outputting a sound. The audio output unit 252 may be configured to transmit a sound according to a general audio output scheme or a bone conduction scheme. In a case in which the audio output unit 252 is implemented according to the bone conduction scheme, when the user wears the HMD 200, the audio output unit 252 may be tightly attached to a head part and vibrate the skull to transmit a sound.

As illustrated in FIG. 2B, the display unit 251 is mounted in the frame unit to serve to output screen information (for example, an image, video, etc.) in front of the user's eyes. The display unit 251 may be disposed to correspond to at least one of the left eye and the right eye such that screen information may be displayed in front of the user's eyes when the user wears the HMD 200. That is, the display unit 251 may be provided to cover at least one of the user's left eye and right eye (or to face at least one of the user's left eye and right eye).

For example, the display unit 251 of the HMD 200 related to the present disclosure may be positioned within the HMD main body. In detail, the display unit 251 may be disposed within the HMD 200 and may be disposed in a position facing the user's eyes when the user wears the HMD 200 on his or her head.

Also, the HMD 200 may include a lens unit 203 such that the user may view entire screen information output on the display unit 251 formed within the HMD main body. That is, the HMD 200 related to the present disclosure may be configured such that screen information (or light) output from the display unit 251 through the lens unit 203 may be entirely transmitted to the user's eyeballs (or the user's visual field).

For example, the lens unit 203 may be disposed to correspond to at least one of the user's both eyes (that is, the left eye and the right eye). Also, the lens unit 203 may be disposed to be positioned between the user's eyeballs and the display unit 251 when the user wears the HMD on his or her head.

A viewing angle of the lens unit 203 may be varied according to a distance between the user's eyeballs and the display unit 251, and thus, the lens unit 203 may be formed such that a position thereof is varied under the user's control. Also, the lens unit 203 may be formed to include a concave lens, a convex lens, or a combination thereof.

Also, the display unit 251 may project an image to the user's eyes by using a prism. Also, the prism may be light-transmissive so that the user may view both a projected image and a general visual field of the front side (a range viewed by the user through the eyes).

In this manner, an image output through the display unit 251 may be viewed such that it overlaps a general visual field. Using such characteristics of the display, the HMD 200 may provide augmented reality (AR) in which a virtual image overlaps an image or a background of the reality so as to be visible as a single image.

That is, the display unit 251 may be configured to prevent ambient light from passing therethrough to implement virtual reality (VR), or to allow ambient light to pass therethrough to implement augmented reality (AR).

Also, although not shown, the display unit 151 covering at least one of the left eye and the right eye may be detachably mounted in the frame unit.

Also, the display unit 251 may be a display unit of an external mobile terminal. The HMD main body 200 (frame unit) may be configured such that an external mobile terminal is detachably attached thereto, and may be electrically connected to the external mobile terminal. In a case in which the HMD main body 200 is electrically connected to the external mobile terminal 200, the controller 280 of the HMD may control the external mobile terminal.

In a case in which the external mobile terminal is installed in the HMD body 200, the camera 221, the sensing unit 240, the display unit 251, and the controller 280 of the HMD 200 described above may be replaced with a camera, a sensing unit, a display unit, and a controller provided in the external mobile terminal.

However, in the present disclosure, in order to reduce a weight, a case in which the HMD 200 itself has the display unit 251, rather than a case in which the external mobile terminal is installed in the HMD main body 200, will be described as an example.

Hereinafter, components provided in the main body of the HMD 200 will be described in detail.

Among the components described above, the wireless communication unit may include one or more modules enabling wireless communication between the HMD 200 and a wireless communication system, between the HMD 200 and a different HMD, between the HMD 200 and a mobile terminal (or a fixed terminal), between the HMD 200 and a control device, between the HMD 200 and a camera installed on the outside and capable of performing wireless communication, and between the HMD 100 and an external server.

Also, the wireless communication unit may include one or more modules connecting the HMD 200 to one or more networks.

The wireless communication unit may include at least one of a broadcast receiving module, a mobile communication module, a wireless Internet module, a short range communication module, and a position information module. These modules may be inferred and applied in the same or similar manner from the contents of the wireless communication described above with reference to FIG. 1A.

However, the present disclosure is not limited thereto and the mobile terminal 100 and the HMD 200 related to the present disclosure may transmit and receive data therebetween in a wired communication manner through the interface unit 160 of the mobile terminal 100 and the interface unit 260 of the HMD 200.

Figure 3:
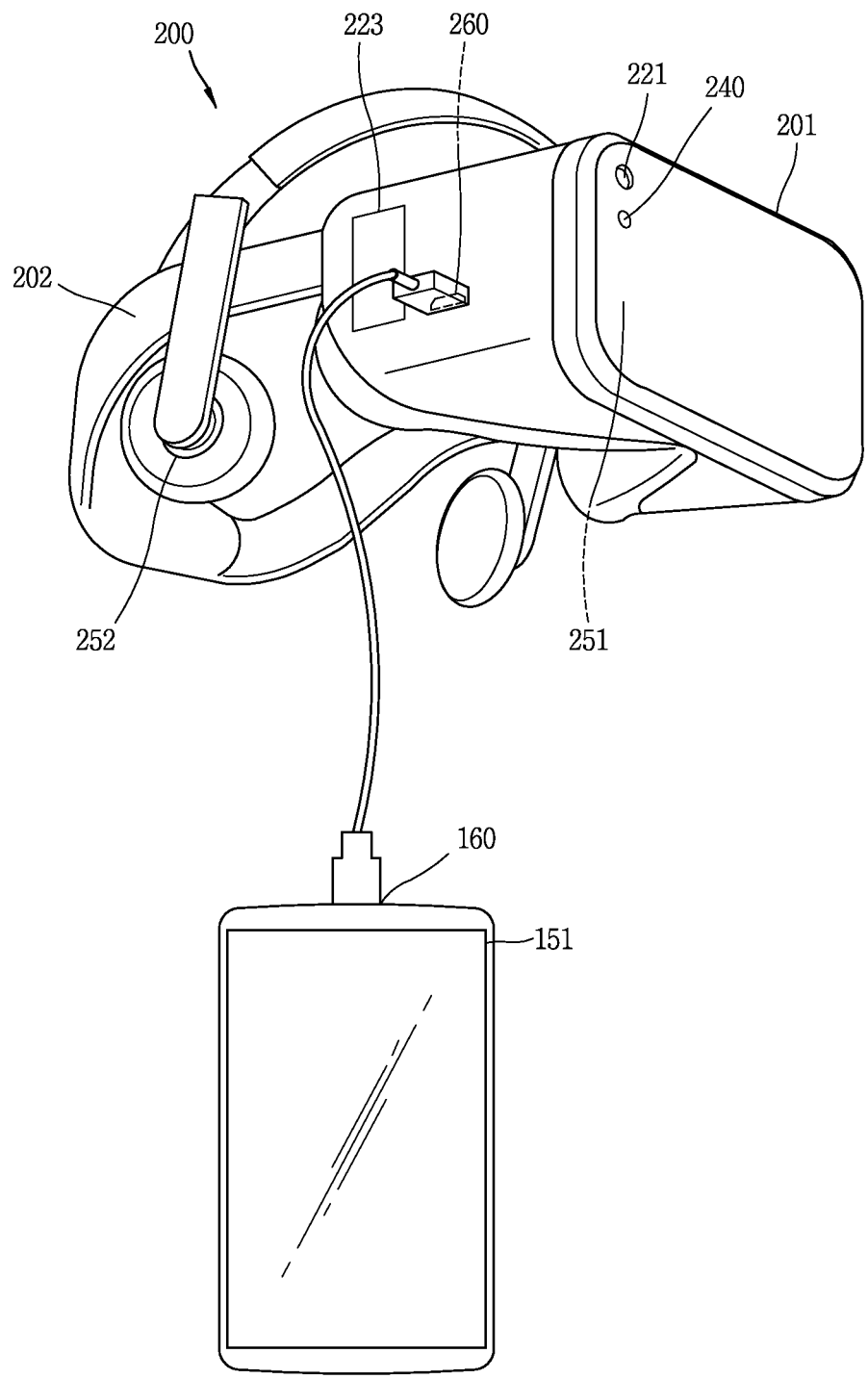
FIG. 3 is a conceptual view illustrating an embodiment in which a mobile terminal related to the present disclosure and an HMD are connected to perform wired communication.

FIG. 3 is a conceptual view illustrating an embodiment in which a mobile terminal related to the present disclosure and an HMD are connected to perform wired communication.

Referring to FIG. 3, the HMD 200 related to the present disclosure may have the interface unit 260. The interface unit 260 may be provided in the first frame 201 of the HMD main body 200.

The interface unit 260 of the HMD 200 may serve as a passage with every external device (for example, the mobile terminal 100) connected to the HMD 200. The interface unit 260 may receive data from the external device or receive power from the external device and transmit the received data or power to each component of the HMD 200 or may transmit internal data of the HMD 200 to the external device (mobile terminal 100). For example, a wired/wireless headset port, an external charger port, a wired/wireless data port, a memory card port, a port connecting a device having an identification module, an audio input/output (I/O) port, a video I/O port, an earphone port, and the like, may be included in the interface unit 260.

As illustrated in FIG. 3, the interface unit 260 of the HMD 200 and the interface unit 160 of the mobile terminal 100 may be connected to communicate with each other through a cable. For example, the interface unit 260 of the HMD 200 and the interface unit 160 of the mobile terminal 100 may be a wired data port. Types of the ports of the interfaces 160 and 260 may be the same or different.

The HMD 200 wiredly connected to the mobile terminal 100 may be controlled by the controller 180 of the mobile terminal 100. Also, the controller 280 of the connected HMD 200 may control the HMD 200 on the basis of data (for example, a control command) received from the mobile terminal 100 through a cable.

In the present disclosure, for the purposes of description, a case in which the HMD 200 is controlled by the controller 180 of the mobile terminal 100 to which the HMD 200 is wiredly connected will be described as an example. However, it will be obvious that the operation performed by the controller 180 of the mobile terminal 100 described hereinafter may also be performed by the controller 280 of the HMD 200.

The mobile terminal 100 wiredly/wirelessly connected to the HMD 200 such that data transmission/reception can be performed therebetween may serve as a controller (i.e., a control device or a controller) controlling the HMD 200.

Figure 4:
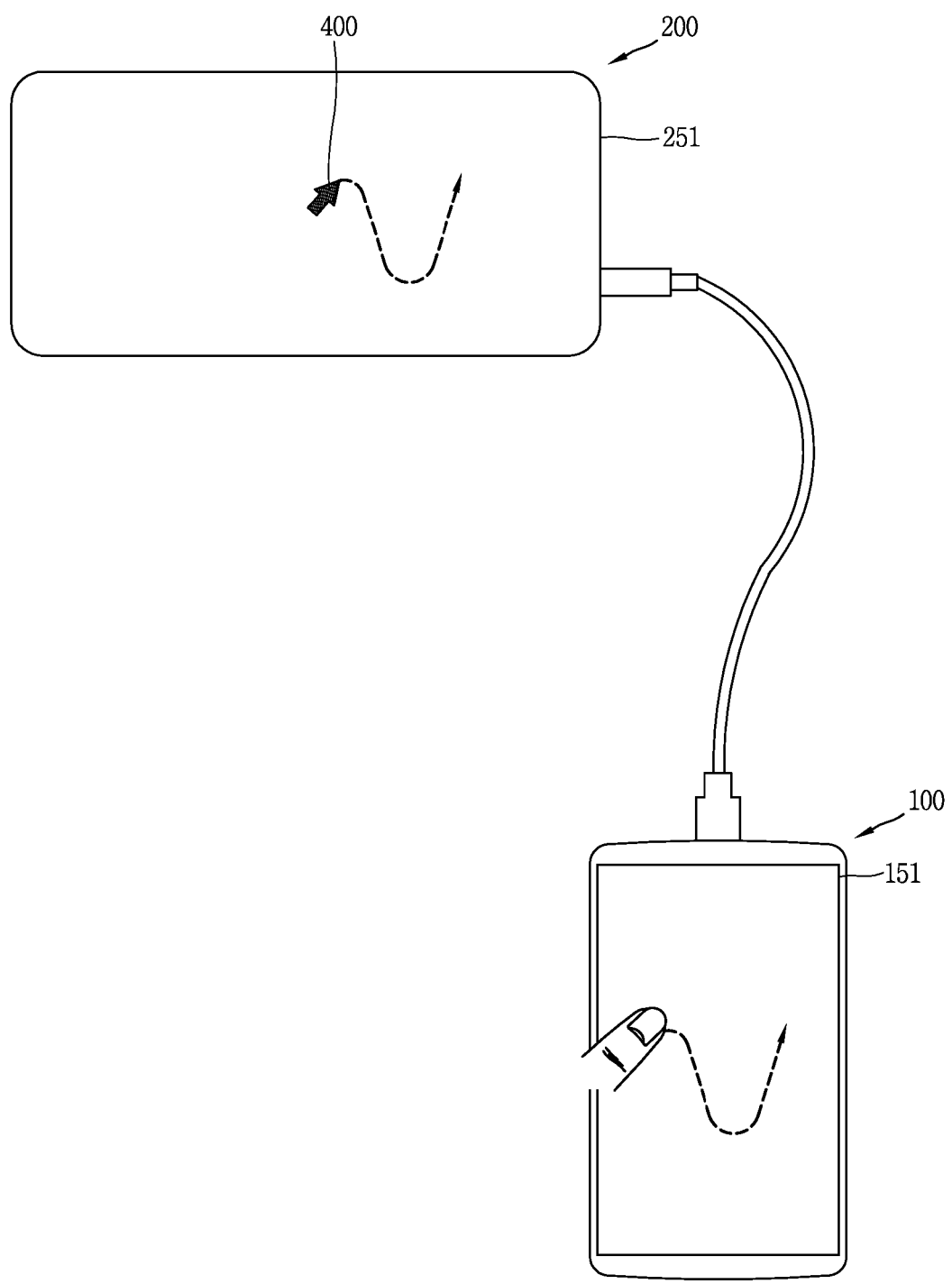
FIG. 4 is a conceptual view illustrating a method for controlling an HMD using a mobile terminal according to an embodiment of the present disclosure.

FIG. 4 is a conceptual view illustrating a method for controlling an HMD using a mobile terminal according to an embodiment of the present disclosure.

As described above, the HMD 200 related to the present disclosure may be controlled by the mobile terminal 100 connected to the mobile terminal 100 such that wired/wireless communication can be performed therebetween. Hereinafter, as illustrated in FIGS. 3 and 4, an example in which the HMD 200 and the mobile terminal 100 are connected for data communication through a cable will be described.

For example, as illustrated in FIG. 4, a cursor 400 may be displayed on the display unit 251 of the HMD 200. The cursor 400 may be output on the display unit 251 of the HMD 200 when the HMD 200 is in an ON state, when an operation mode of the HMD 200 is a specific operation mode, or according to a user request.

For example, the user request may include a user input applied to the user input unit 223 of the HMD 200, a user input (or a touch) applied to the touch screen 151 of the mobile terminal 100 connected to the HMD 200 through a cable, and a movement of the main body 100 of the mobile terminal or the main body of the HMD 200 by external force, which corresponds to a preset movement.

The cursor 400 displayed on the display unit 251 of the HMD 200 may be moved by the mobile terminal 100 connected in a wired manner. For example, when a preset type of touch (for example, a drag touch) is applied to the touch screen 151, the controller 180 may control the display unit 251 of the HMD 200 such that the cursor 400 may be moved dependently according to the touch.

In a case in which the controller 280 of the HMD 200 is implemented to independently operate with respect to the controller 180 of the wiredly connected mobile terminal 100, when the preset type of touch is applied to the touch screen 151, the controller 180 of the mobile terminal 100 may transmit a signal related to the touch to the HMD 200 through an interface unit.

Thereafter, the controller 280 of the HMD 200 may be configured to move the cursor 400 displayed on the display unit 251 of the HMD 200 on the basis of the signal related to the touch.

Hereinafter, for the purposes of description, a case in which components included in the HMD 200 are controlled by the controller 180 of the mobile terminal 100 will be described as an example. Such an operation may mean that the wiredly connected HMD 200 is coupled as a component of the mobile terminal 100 and operated (or controlled).

In FIG. 4, a case in which the cursor 400 displayed on the display unit 251 of the HMD 200 is moved by using the mobile terminal 100 is described as an example, but the present disclosure is not limited thereto.

In an embodiment of the present disclosure, a three-dimensional (3D) image (hereinafter, referred to as a "virtual space") formed as a stereoscopic space may be output on the display unit 251 of the HMD 200.

Figure 5B:
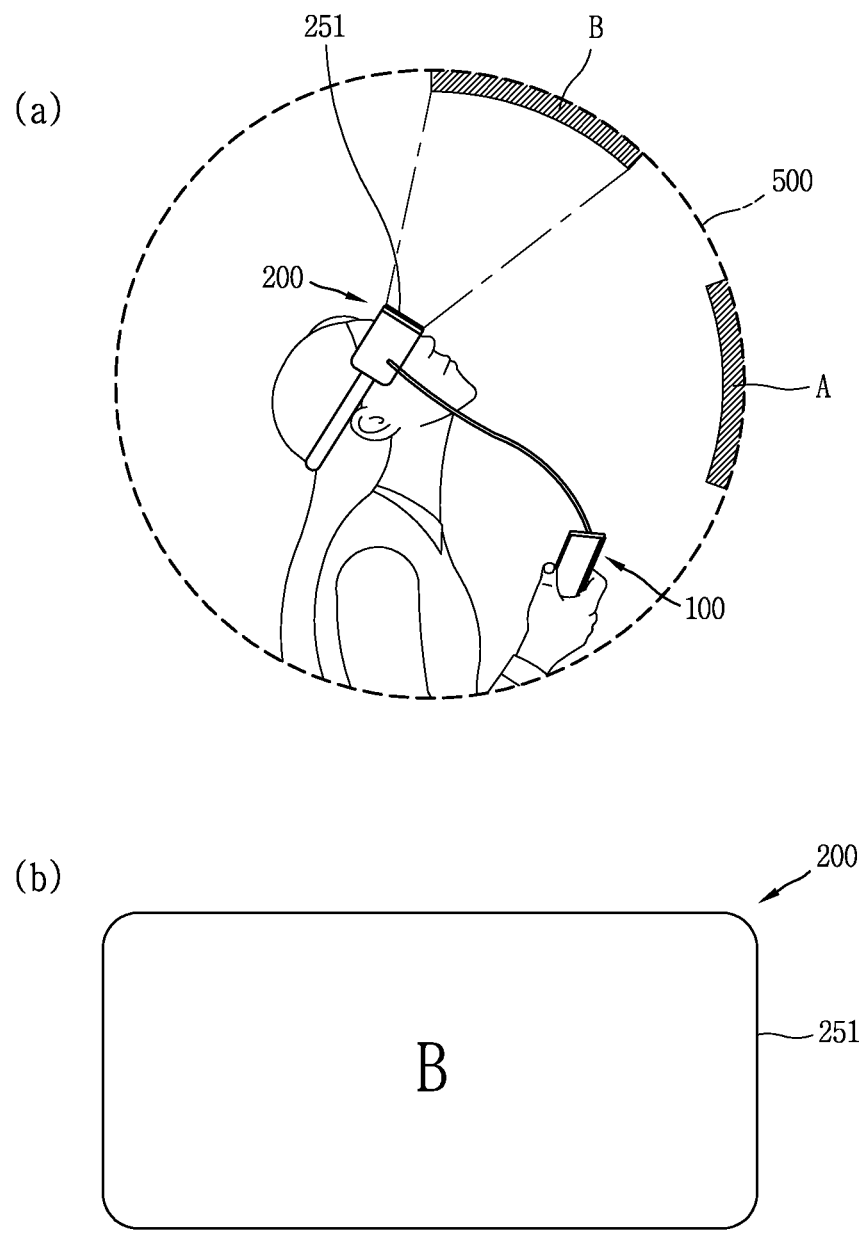

FIGS. 5A and 5B are conceptual views illustrating a virtual space related to an embodiment of the present disclosure.

A virtual space 500 (or a virtual space image) related to the present disclosure may refer to a 3D image formed in omnidirections (for example, 360 degrees) with respect to a user who wears the HMD 200. The virtual space 500 may be a stereoscopic space image (i.e., a stereoscopic image or a 3D image) rendered to recognize that a user who wears the HMD 200 is present in a specific space (or a virtual space). For example, as illustrated in (a) of FIG. 5A, it may be recognized that the user who wears the HMD 200 is present in the virtual space 500.

As illustrated in (a) and (b) of FIG. 5A, the controller 180 of the mobile terminal 100 may output a region (for example, a first region A) of the virtual space 500 on the display unit 251 of the weirdly connected HMD 200. Information related to the virtual space may refer to the 3D image itself described above or at least data forming the 3D image.

In detail, when a request for outputting a virtual space is received, the controller 180 of the mobile terminal 100 may output one region A of the virtual space requested to be output on the display unit 251 of the HMD 200.

Meanwhile, the one region A of the virtual space output on the display unit 251 of the HMD may be changed on the basis of a movement of the user who wears the HMD 200.

For example, when the head part of the user who wears the HMD 200 moves, the sensing unit 240 of the HMD 200 may sense the movement. The movement may be made in a state in which the one region A of the virtual space 500 is output on the display unit 251 of the HMD 200.

The movement described in this disclosure may be understood as having a concept including a movement, a rotation, or a combination thereof.

Thereafter, the sensing unit 240 (or the controller 280 of the HMD 200) may transmit information related to the movement to the controller 180 of the mobile terminal 100 wiredly connected to the HMD 200. Thereafter, on the basis of the transmitted information related to the movement, the controller 180 of the mobile terminal 100 may control may control the display unit 251 of the HMD 200 to output a region B different from the one region A of the virtual space 500.

For example, as illustrated in (a) of FIG. 5B, when the main body of the HMD 200 is moved (or rotated) in a state in which the one region A of the virtual space 500 is output on the display unit 251, the controller 180 of the mobile terminal 100 may output the region B different from the one region A of the virtual space 500 to the display unit 251 on the basis of the movement as illustrated in (a) and (b) of FIG. 5B.

Through this configuration, the present disclosure can provide a user interface allowing the user who uses the HMD 200 to feel as if he or she actually moves in a virtual space.

Hereinafter, a method for controlling the HMD wiredly connected to the mobile terminal by using the mobile terminal will be described in detail with reference to the accompanying drawings.

Also, hereinafter, a controlling operation of the mobile terminal 100 in a system including the mobile terminal 100 and the HMD 200 related to the present disclosure will be largely described.

Figure 8:
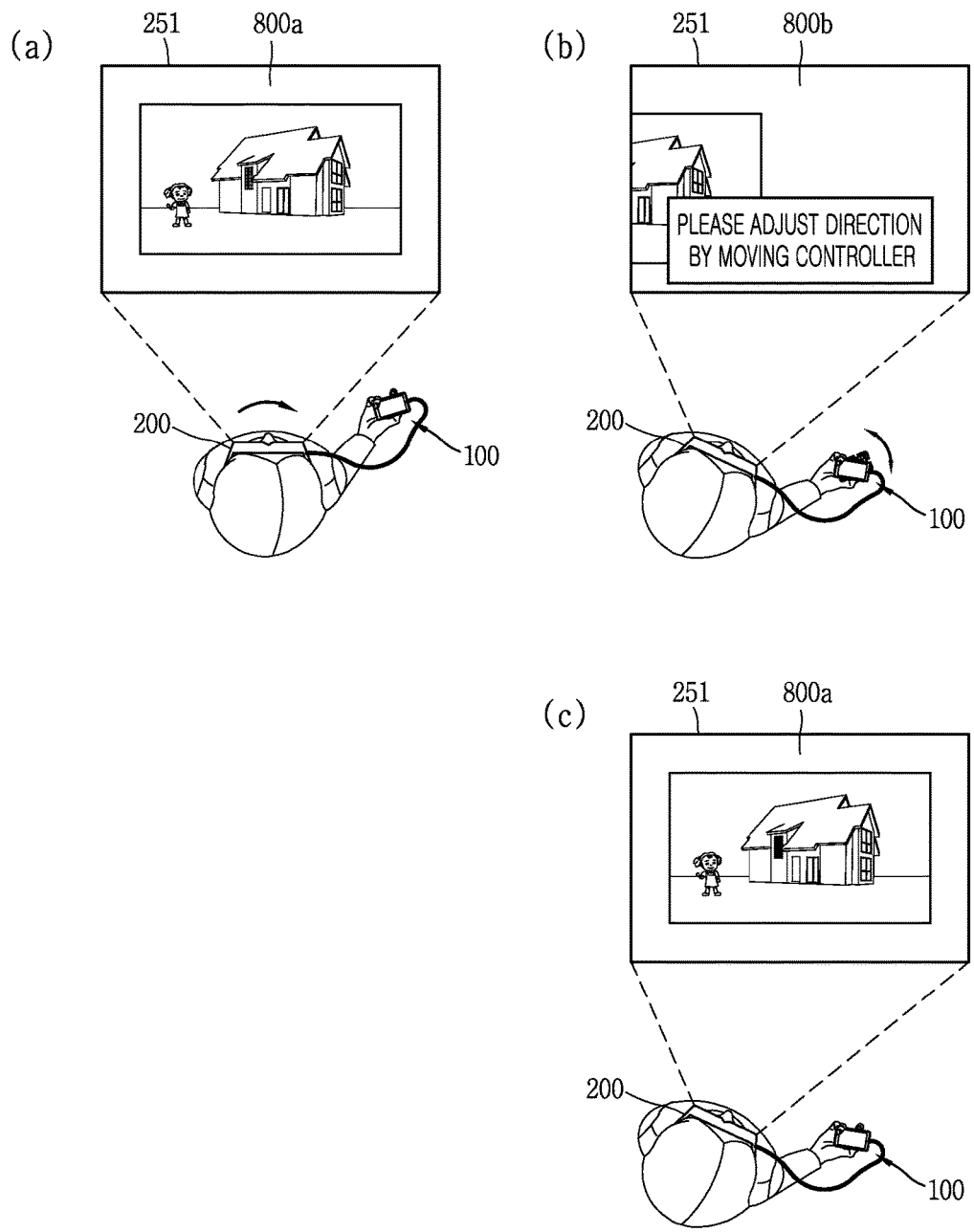

FIG. 6 is a flow chart illustrating a representative control method according to an embodiment of the present disclosure, and FIGS. 7 and 8 are conceptual views illustrating the control method of FIG. 6.

First, in the present disclosure, a virtual space (i.e., a virtual space image or a 3D image) is output on the display unit 251 of the HMD 200 according to a user request. That is, the controller 180 of the mobile terminal 100 outputs a preset first region of the virtual space on the display unit 251 of the HMD wiredly connected to the mobile terminal 100 (S610).

When the virtual space is output on the display unit 251 of the HMD 200, the preset first region may be a default region output as a default, a region including a specific object among objects included in the virtual space, or a specific region set by the user, for example. The specific object may be an object set (or set as a default) by the user among at least one graphic object included in the virtual space.

Also, in a case in which the virtual space, which was previously output, is output on the display unit 251 of the HMD 200, the preset first region may be one region which was output at a termination time point among virtual spaces which were output previously.

As illustrated in (a) of FIG. 7, the controller 180 of the mobile terminal 100 may output a preset first region 700a of a virtual space 700 on the display unit 251 of the HMD 200.

Hereinafter, it is illustrated that the virtual space surrounds the user for the purposes of description, but it should be appreciated that the virtual space is not output in reality (or a real space). That is, the virtual space if a 3D image formed to be output on the display unit 251 of the HMD 200.

Referring back to FIG. 6, in the present disclosure, on the basis of a movement of the HMD 200, a second region different from the first region is output on the display unit 251 of the HMD 200.

In detail, the sensing unit 240 provided in the HMD 200 wiredly connected to the mobile terminal 100 may sense a movement of the HMD 200. Thereafter, the sensing unit 240 may transmit information related to the sensed movement to the mobile terminal in a wired manner.

On the basis of the information related to the movement transmitted from the sensing unit 240 of the HMD 200, the controller 180 of the mobile terminal 100 may determine the movement of the HMD 200 (or the movement of the main body 200 of the HMD).

However, the present disclosure is not limited thereto, and a movement of the HMD 200 may also be sensed by the sensing unit 140 provided in the mobile terminal 100.

For example, the controller 180 may sense (determine or detect) a movement of the HMD 200 connected wiredly or wirelessly to the mobile terminal 100 by using at least one of the proximity sensor 141, the illumination sensor 142, the magnetic sensor, the motion sensor, the infrared (IR) sensor, the ultrasonic sensor, the optical sensor (for example, the camera 121).

On the basis of the movement of the HMD 200, the controller 180 may output the second region of the virtual space 700, instead of the first region of the virtual space 700, on the display unit 251 of the HMD 200.

That is, the sensing unit 140 of the mobile terminal 100 related to the present disclosure may sense a movement of the HMD 100 and the main body of the mobile terminal 100. Also, the movement of the HMD 100 may be sensed by using the sensing unit 240 of the HMD 200.

For example, as illustrated in (a) of FIG. 7, in a state in which the first region 700a of the virtual space 700 is output on the display unit 251 of the HMD 200, when the HMD 200 is moved by the user, as illustrated in (b) of FIG. 7, the controller 180 may output the second region 700b different from the first region 700a of the virtual space 700 on the display unit 251 of the HMD 200.

Thereafter, in the present disclosure, in a state in which the second region 700b of the virtual space 700 is output, when the main body of the mobile terminal 100 is moved as a preset movement (that is when a movement of the main body of the mobile terminal 100 corresponds to the preset movement), the preset first region, instead of the second region, with respect to the current posture of the HMD 200 is output on the display unit 251 of the HMD 200 (S630).

In detail, the controller 180 may sense a movement of the main body of the mobile terminal 100 through the sensing unit 140. The preset movement, a movement associated with a function for outputting the preset first region on the display unit 251 of the HMD 200, may include various types of movements.

For example, the various types of movements may include a movement in which the main body of the mobile terminal 100 is moved by a predetermined distance and returned, a movement in which the main body of the mobile terminal 100 is shaken by a predetermined number of times, a movement in which the main body of the mobile terminal 100 turns by a specific angle (for example, a reversing movement), a movement in which the main body of the mobile terminal 100 rotates by a predetermined angle and is returned, and a movement in which the main body of the mobile terminal 100 is moved in a specific direction.

The posture of the HMD 200 has a concept including a state in which the HMD is placed (in a state in which the HMD 200 is worn on the user's head), a degree by which the HMD 200 is tilted, a direction in which the HMD 200 is oriented, a position of the HMD 200, a rotation of the HMD 200, and a movement of the HMD 200.

That is, a current posture of the HMD 200 may refer to a state in which the HMD 200 is placed such that the second region, rather than the preset first region, of the virtual space 700 is output on the display unit 251 of the HMD 200.

As illustrated in (c) of FIG. 7, in a state in which the second region 700b of the virtual space 700 is output on the display unit 251, when the terminal body 100 is moved as a preset movement, as illustrated in (d) of FIG. 7, even though a movement of the HMD 200 is not sensed (that is, on the basis of the current posture of the HMD 200) the preset first region 700a may be output on the display unit 251 of the HMD 200.

In other words, as illustrated in (d) of FIG. 7, the controller 180 may relatively rotate the virtual space 700 with respect to the HMD 200 such that the preset first region 700a of the virtual space 700 may be output on the display unit 251 of the HMD 200 in response to the preset movement of the terminal body 100.

That is, when the preset movement is sensed in the terminal body 100, even though the user's head that wears the HMD 200 does not move, the controller 180 may output the preset first region on the display unit 251 of the HMD 200.

FIG. 8 illustrates a case in which the preset first region is a region including a specific object among objects included in a virtual space.

As illustrated in (a) of FIG. 8, a preset first region 800a (or first screen information) of a virtual space may be output on the display unit 251 of the HMD 200. As illustrated in (a) of FIG. 8, the preset first region 800a may include a specific object. The specific object may be an object formed to output an image or video stored in the memory 170 of the mobile terminal 100 or screen information received from an external server (or the Internet).

When a movement of the HMD 200 is sensed as illustrated in (a) of FIG. 8, a second region 800b different from the preset first region 800a (or second screen information different from the first screen information) of the virtual space may be output on the display unit 251 of the HMD 200 in response to the movement as illustrated in (b) of FIG. 8.

Here, as illustrated in (b) of FIG. 8, when at least a portion of the specific object included in the first region disappears from the display unit 251 of the HMD 200 according to the movement, the controller 180 may output notification information indicating that the screen may be adjusted through a movement of the mobile terminal 100, on the display unit 251.

In a state in which the second region 800b different from the preset first region 800a of the virtual space is output (or in a state in which the notification information is output), when it is sensed that that the terminal body 100 is moved as a preset movement, the controller 180 may output the preset first region (or the first screen information) 800a, instead of the second region 800b, on the display unit 251 of the HMD 200 as illustrated in (c) of FIG. 8.

Here, the method for outputting the preset first region on the display unit 251 of the HMD 200 again is not limited to the case in which the terminal body 100 is moved as a preset movement.

For example, in a state in which the second region of the virtual space is output on the display unit 251 of the HMD 200, when a preset type of touch is applied to the touch screen 151 of the mobile terminal 100 or when a preset type of touch is applied to the user input unit 223 of the HMD 200, the controller 180 of the mobile terminal 100 (or the controller 180 of the HMD 200) related to the present disclosure may output the preset first region of the virtual space on the display unit 251 of the HMD 200.

The preset type of touch may be a touch for performing a function of outputting the preset first region of the virtual space on the display unit 251 of the HMD 200, and may include various types of touches. For example, the various types of touches may include a short touch, a long touch, double touches, a multi-touch, a drag touch, a flick touch, a pinch-in touch, a pinch-out touch, a swype touch, a hovering touch, and the like.

Hereinafter, various types of touches will be described in detail.

The short (or tap) touch may be a touch that a touch object (for example, a finger or a stylus pen) is brought into contact with (or is applied to) the touch screen 151 and released within a predetermined period of time. for example, the short (or tap) touch may be a touch that the touch object contacts the touch screen for a short period of time, like a single clock of a mouse.

The long touch may be a touch that a touch object is brought into contact with the touch screen 151 and maintained for more than a predetermined period of time. For example, the long touch may be a touch which is applied to the touch screen 151 by a touch object and subsequently maintained for more than a predetermined period of time. In detail, the long touch may be a touch maintained at one point of the touch screen for more than a predetermined period of time and released thereafter. The long touch may also be understood as a touch corresponding to a touch and hold operation in which a contact state of a touch object is maintained for more than a predetermined period of time on the touch screen 151.

The double touch may be short touches continuously applied to the touch screen 151 at least twice within a predetermined period of time.

The predetermined period of time described above regarding the short touch, the long touch, and the double touches may be determined by a user setting.

The multi-touch may be touches applied to at least two contact points of the touch screen 151 at the substantially same time point.

The drag touch may be a touch that a contact starting from a first point of the touch screen 151 is continuously applied in one direction on the touch screen and the contact is released from a second point different from the first point.

In detail, the drag touch may be a touch which is applied by a touch object to one point of the touch screen 151, continuously extends from the one point along a surface of the touch screen 151, and is released from a point different from the one point.

Also, the drag touch may be a touch which is applied to one point of the touch screen 151 and continuously extends from the touch.

The flick touch may be a drag touch applied within a predetermined time. In detail, the flick touch may be a drag touch which is applied by a touch object and released from the touch screen 151 within a predetermined time. In other words, the flick touch may be understood as a drag touch applied at a speed equal to or higher than a preset speed.

The swipe touch may be a drag touch applied as a straight line.

The pinch-in touch may be first and second touches applied to two different points (separated points) on the touch screen 151, of which at least one extends in a direction toward the other. For example, the pinch-in touch may be a touch that corresponds to a motion of narrowing a space between fingers in a state in which the fingers are in contact with two points spaced apart from one another on the touch screen 151.

The pinch-out touch may be a touch that, at least one of first and second touches applied to two different points (two separated points) on the touch screen 151 extends in a direction away from the other. For example, the pinch-out touch may be a touch that corresponds to a motion of widening fingers (becoming distant) in a state in which the fingers are in contact with two points spaced apart from one another on the touch screen 151.

The hovering touch may be a touch that corresponds to a movement of a touch object in a space away from the touch screen 151 in a state in which the touch object is not in contact with the touch screen 151. The hovering touch may be, for example, the proximity touch described above with reference to FIG. 1. For example, the hovering touch may be a touch corresponding to a movement of the touch object maintained at a spot separated from the touch screen 151 for a predetermined period of time.

Also, the preset type of touch may include a drag touch applied to form a specific locus (trace) (or a pattern) or may include at least two touches applied to form a specific pattern (for example, a pattern formed by a plurality of touch points).

That is, when the terminal body is moved as a preset movement or when a preset type of touch is applied to the touch screen 151, the mobile terminal 100 related to the present disclosure may control the display unit 251 of the HMD to output a preset first region of a virtual space.

Through this configuration, in the present disclosure, even though the user who wears the HMD 200 does not move his or her head part to output the preset first region (for example, a default region) on the display unit 251 of the HMD 200, a user interface allowing for more conveniently outputting the preset first region by using the mobile terminal connected in a wired manner may be provided.

Hereinafter, various schemes for controlling a virtual space that can be output on the HMD 200 by the mobile terminal 100 related to the present disclosure will be described in detail with reference to the accompanying drawings.

Figure 9:
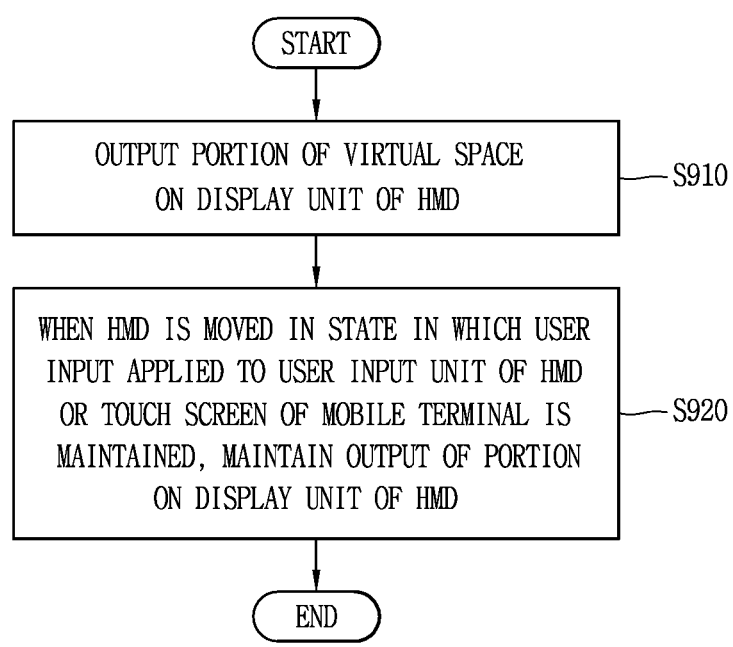
FIG. 9 is a flow chart illustrating a control method according to an embodiment of the present disclosure.

FIG. 9 is a flow chart illustrating a control method according to an embodiment of the present disclosure, and FIG. 10 is a conceptual view illustrating the control method of FIG. 9.

Referring to FIG. 9, a portion of a virtual space is output on the display unit 251 of the HMD 200 (S910). In detail, the controller 180 may output a portion of a virtual space (or a virtual space image) on the display unit 251 of the HMD 200 connected in a wired manner.

Thereafter, in the present disclosure, when the HMD 200 is moved in a state in which a user input applied to the touch screen of the mobile terminal 100 (or the user input unit of the HMD 200), the output of the portion is maintained on the display unit 251 of the HMD 200 (S920).

In detail, the mobile terminal 100 related to the present disclosure may have the touch screen 151. In a state in which a portion of the virtual space is output on the display unit 251 of the HMD 200 connected in a wired manner, when the HMD 200 is moved in a state in which the user input is maintained on the touch screen 151, the output of the portion of the virtual space may be maintained on the display unit 251 of the HMD 200.

Maintaining of the output of the portion of the virtual space may refer to not changing screen information (that is, the portion of the virtual space) output on the display unit 251 of the HMD 200.

When a movement of the HMD 200, as a basic operation, is sensed, the controller 180 may change the screen information output on the display unit 251 of the HMD 200 on the basis of the movement. However, when the HMD 200 is moved in a state in which a user input (for example, a touch) is maintained on the touch screen 151 of the mobile terminal 100, the controller 180 may maintain (or fix) output of screen information 9 for example, a portion of the virtual space) output at a point in time at which the user input is applied.

Also, the controller 180 may sense a user input (for example, a touch) applied to the user input unit 223 provided in the HMD 220. Even when the HMD 200 is moved in a state in which a user input (for example, a touch or a long touch) is maintained on the user input unit 223 provided in the HMD 200, the controller 180 may maintain the output of the portion of the virtual space on the display unit 251 of the HMD 200.

Meanwhile, when the HMD 200 is moved in a state in which a user input is not applied to the touch screen 151 of the mobile terminal 100 (or the user input unit 223 of the HMD), the controller 180 may output a portion of the virtual space, which is different from the one portion, on the display unit 251 of the HMD 200.

The contents described above may be clarified through FIG. 10.

As illustrated in (a) of FIG. 10, a portion 1000a of a virtual space 1000 may be output on the display unit 251 of the HMD 200. Thereafter, when the HMD 200 is moved in a state in which a user input (for example, a touch) applied to the touch screen 151 of the mobile terminal 100 is maintained, the controller 180 may maintain outputting of the portion 1000a of the virtual space on the display unit 251 of the HMD 200 as illustrated in (b) of FIG. 10. That is, the controller 180 may relatively rotate the virtual space 1000 with respect to the HMD 200 such that outputting of the portion 1000a is maintained.

Meanwhile, when the HMD 200 is moved in a state in which a user input is not applied to the touch screen 151 of the mobile terminal 100 as illustrated in (c) of FIG. 10, the controller 180 may output a portion 1000b of the virtual space 100, which is different from the portion 1000a, on the display unit 251 of the HMD 200 as illustrated in (d) of FIG. 10.

Through this configuration, in this disclosure, in a case in which the user wants to change only a posture in which the HMD 200 is worn (that is, in a case in which the user wants to change the posture in a state in which the screen information output on the display unit 251 of the HMD 200 is maintained (fixed), a UI/UX capable of performing the corresponding operation through a optimized method can be provided.

Hereinafter, various embodiments related to the mobile terminal 100 and the HMD 200 will be described with reference to the accompanying drawings.

FIGS. 11A, 11B, 12A, 12B, and 13 are conceptual views illustrating a method for controlling an HMD using a mobile terminal according to another embodiment of the present disclosure.

The mobile terminal related to the present disclosure may have the wireless communication unit 110.

When an event occurs through the wireless communication unit 110, the controller 180 of the mobile terminal 100 may form event information related to the event in the virtual space.

The event may include, for example, reception of a message, reception of a call signal, an absent call, alarm, schedule notification, reception of an e-mail, reception of information through an application, and the like.

Also, an event mentioned in this disclosure is not limited to an event that occurs through the wireless communication unit 110. For example, the event may further include an alarm function set in the mobile terminal 100, alarm generated by the schedule function, and the like.

As illustrated in (a) of FIG. 11A, in a state in which at least a portion 1100a (or at least a portion of certain screen information) of a virtual space 1100 is output on the display unit 251 of the HMD 200, when an event occurs in the mobile terminal 100, the controller 180 may form (or generate) event information related to the event in the virtual space 1100.

Here, as illustrated in (b) of FIG. 11A, at least a portion of the event information 1120 may be displayed in order to inform about the occurrence of the event. Also, as illustrated in (b) of FIG. 11A, the controller 180 may output notification information (for example, a graphic object, an icon, an image, and the like) 1130 indicating the occurrence of the event on the display unit 251 of the HMD 200.

In order to guide a position where the event information 1120 is formed (generated) and prevent interference of user's viewing (or visual field), only a portion 1120a of the event information 1120 may be output on the display unit 251 of the HMD 200.

Also, in order to guide a position where the event information is formed in the visual space, the controller 180 may output a notification sound to any one of a left audio output unit and a right audio output unit provided in the HMD 200 (or any one of a left audio output unit and a right audio output unit formed in a headset or a speaker).

For example, in a case in which the event information is formed on the right with respect to a currently viewed region, the controller 180 may output the notification sound only to the right audio output unit. In a case in which the event information is formed on the left with respect to the currently viewed region, the controller 180 may output the notification sound only to the left audio output unit.

In a state in which the portion 1120a of the event information 1120 is output on the display unit 251 of the HMD 200, when the HMD 200 is rotated (or moved) in a direction in which the event information is formed, a size of the portion 1120a of the event information output on the display unit 251 of the HMD may be increased.

For example, as illustrated in (a) of FIG. 11B, in a state in which only the portion 1120a of the event information 1120 formed in the virtual space 1100 is output on the display unit 251 of the HMD 200, when the HMD 200 is rotated in a direction (for example, to the right) in which the event information 1120 is formed, the entirety of the event information 1120 may be output on the display unit 251 of the HMD 200 in response to the rotation.

In a state in which the event information is output on the display unit 251 of the HMD 200 (or in a state in which the event information is entirely output or in a state in which the event information having a size equal to or greater than a preset size is output), the controller 180 of the mobile terminal 100 may perform an operation related to the event on the basis of a user input applied to the mobile terminal 100.

For example, when a touch is applied to the touch screen 151 of the mobile terminal 100 (or when the event information is entirely output on the display unit 251 of the HMD 200 or when a portion of the event information having a size equal to or greater than a preset size is output on the display unit 251 of the HMD 200), a cursor 1140 may be output on the display unit 251 of the HMD 200 as illustrated in (a) of FIG. 11B. Thereafter, on a basis of a touch input applied to the touch screen 151 of the mobile terminal 100, the controller 180 may perform an operation related to the event.

Here, the operation related to the event may vary according to types of generated events. For example, in a case in which the event is reception of a call signal, the operation related to the event may be connection of a call, rejection of a call, or recording of a call. Also, in a case in which the event is reception of a message or reception of information through an application, the operation related to the event may include reading a message, responding, connection of an application, and the like.

Also, the operation related to the event may include a function of making output event information disappear and a function of changing the output event information into a specific icon (or a graphic object).

In another example, in a state in which the event information is output on the display unit 251 of the HMD 200 (or in a state in which the event information is entirely output or in a state in which the event information having a size equal to or greater than the preset size is output), when the terminal body 100 is moved as a specific movement, the controller 180 may perform an operation related to the event.

For example, as illustrated in (b) of FIG. 11B, in a state in which information related to reception of a call signal is output on the display unit 251 of the HMD 200, when a movement of the terminal body 100 in the vicinity of the user's ear is detected, the controller 180 may connect a call.

Although not shown, the controller 180 may detect user's eyes by using the sensing unit 140 of the mobile terminal 100 (a method of detecting user's eyes is obvious, and thus, descriptions of details thereof will be omitted.

While the user is gazing at any one point of the event information, when the terminal body 100 is moved as a preset movement, the controller 180 may determine the preset movement as a control command for selecting (or clicking or executing).

That is, when the terminal body 100 is moved as the preset movement while the user is gazing at any one point of the event information, the controller 180 may select (or execute) a function associated with the any one point.

When the event information output according to the movement of the HMD 200 disappears from the display unit 251 of the HMD 200, the controller 180 may make the event information disappear from the virtual space 1100 or may limit (or mute) the notification sound being output (or vibration being generated).

Through this configuration, in the present disclosure, even though an event occurs in the mobile terminal 100 in a state in which the user wears the HMD 200, a UI/UX capable of controlling the event in an optimized manner can be provided.

As described above, the mobile terminal 100 (or the HMD 200) related to the present disclosure, eyes of the user who wears the HMD 200 may be sensed by the sensing unit 240 provided in the HMD 200 (or the sensing unit 140 of the mobile terminal 100).

Figure 12A:
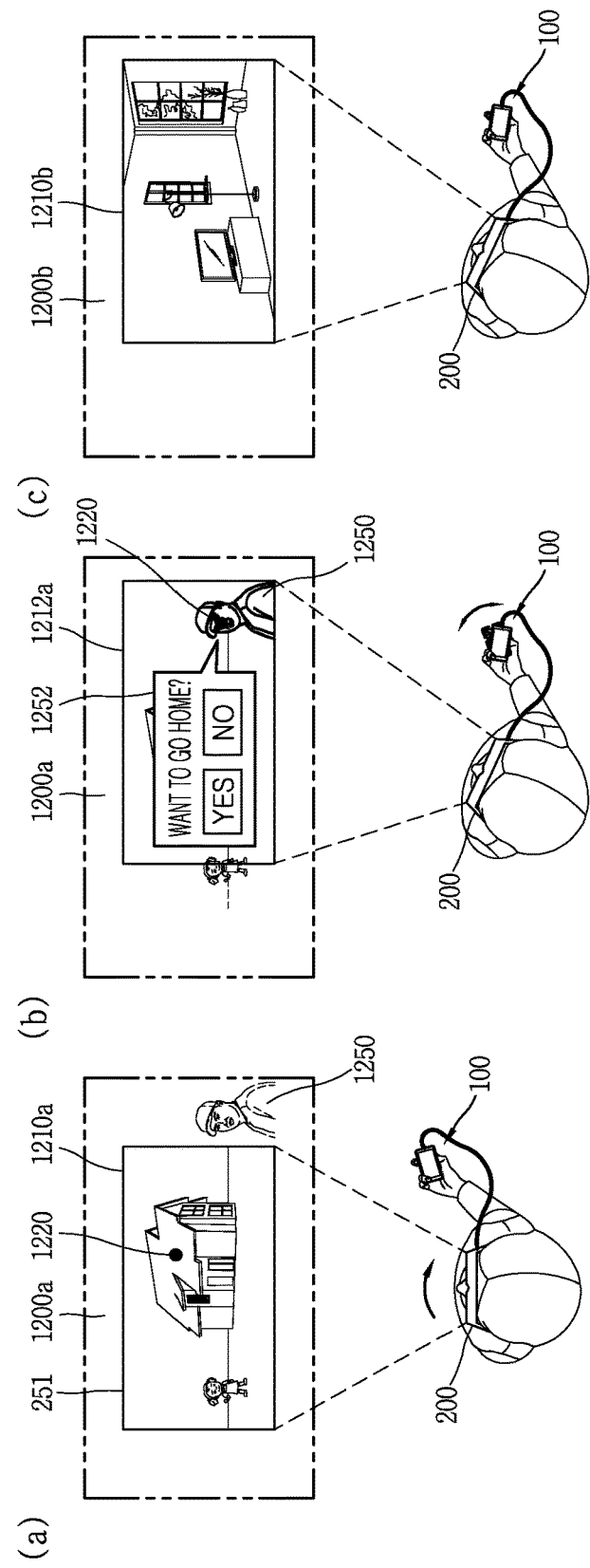

In this case, as illustrated in (a) of FIG. 12A, on the basis of the user's eyes, the controller 180 may output a point (or a cursor, graphic object, etc.) to correspond to the user's eyes on the display unit 251 of the HMD 200.

Meanwhile, the virtual space 1200a may include at least one graphic object 1250 associated with a preset function. The preset function may include every type of function that can be executed in the mobile terminal 100 or the HMD 200. For example, the preset function may include a function of adjusting, a function of outputting an image stored in the mobile terminal, a function of outputting weather information, a function of outputting broadcast, and a function of outputting a virtual home space.

FIG. 12A illustrates that a graphic object 1250 associated with a function of outputting a virtual home space is included in the virtual space 1200a.

When it is detected that the user, who views the display unit 251 of the HMD 200, gazes at any one 1250 of at least one graphic object included in the virtual space 1200a (or when it is detected that the user gazes at the any one 1250 of the at least one graphic object for a period of time equal to or greater than a predetermined period of time or when the terminal body 100 is moved as a preset movement while the user gazes at the any one graphic object), the controller 180 may perform a function associated with the any one graphic object 1250.

For example, as illustrated in (a) and (b) of FIG. 12A, in a state in which a specific region 1212a of a virtual space 1200a is output on the display unit 251 of the HMD 200 according to a movement of the HMD 200, when it is detected that the user gazes at the graphic object 1250 included in the specific region 1212a, the controller 180 may output a selection window 1252 for selecting whether to execute a function associated with the graphic object 1250 on the display unit 251 of the HMD 200.

Thereafter, as illustrated in (b) of FIG. 12A, when the terminal body 100 is moved as a preset movement (for example, a movement associated with a control command for executing a corresponding function, for example, a movement that the terminal body 100 vibrates by a predetermined number of times), the controller 180 may execute the corresponding function as illustrated in (c) of FIG. 12A. Here, in a case in which the corresponding function is a function of outputting a virtual home space, a portion 1210b of a virtual home space 1200b may be output on the display unit 251 of the HMD 200.

The virtual home space may include graphic objects associated with various functions.

Figure 12B:
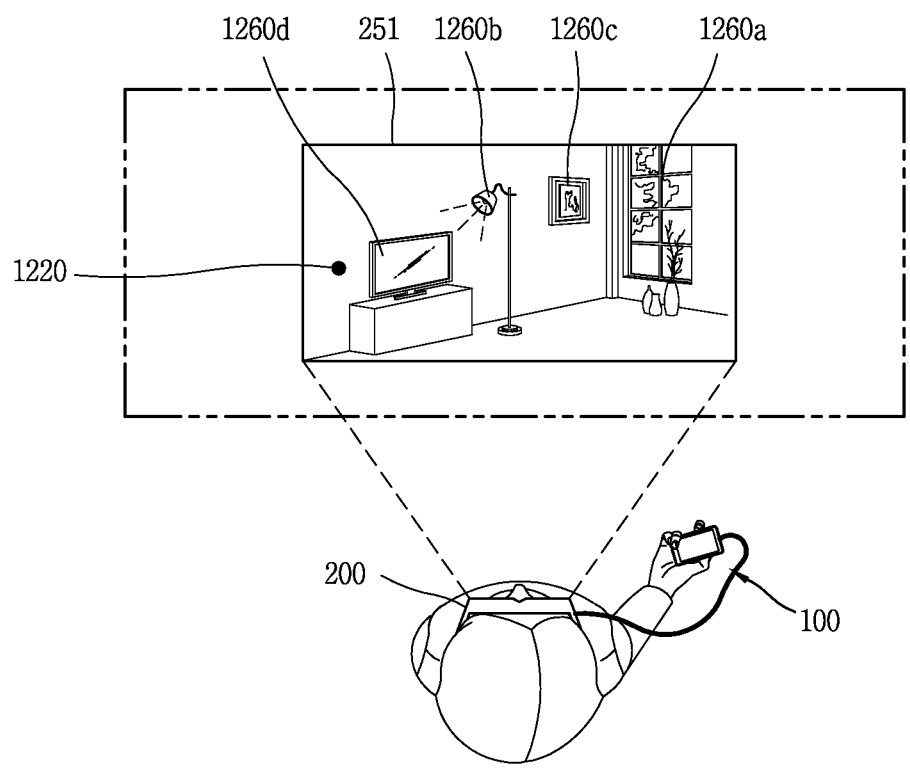

For example, as illustrated in FIG. 12B, various graphic objects such as a graphic object 1260a associated with a weather information function, a graphic object 1260a associated with a brightness adjustment function, a graphic object 1260c associated with a function of outputting an image stored in the mobile terminal 100, and a graphic object 1260d associated with a broadcast output function may be included in the virtual home space. When it is detected that the user gazes at a specific graphic object (or when it is detected that the user gazes the specific graphic object for a period of time equal to or greater than a predetermined period of time or when the terminal body 100 is moved as a preset movement while the user gazes at the graphic object), the controller 180 may perform (execute) a function associated with the specific graphic object.

Figure 13:
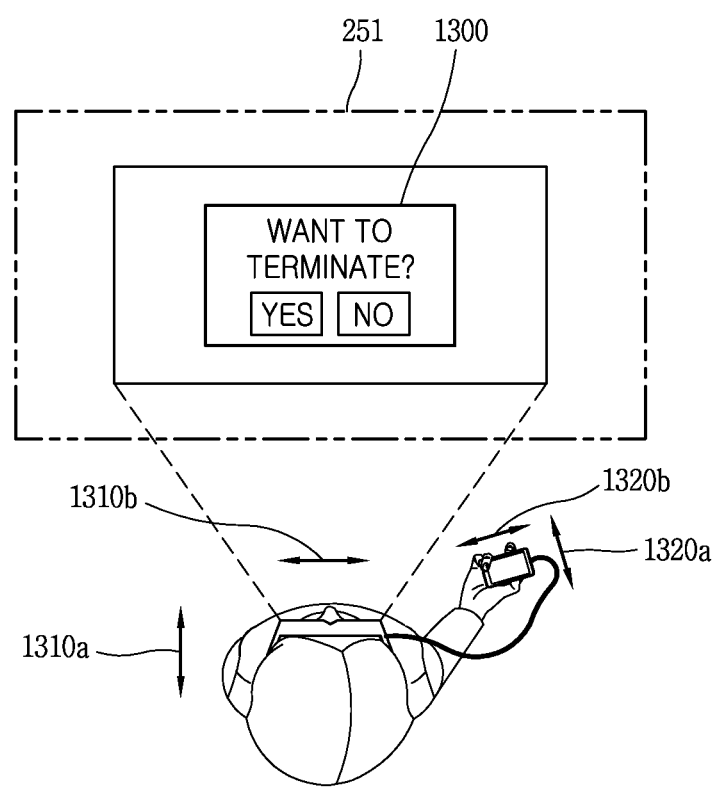

Meanwhile, as illustrated in FIG. 13, a selection window 1300 allowing for selection of any one of at least two operations may be output on the display unit 251 of the HMD 200 related to the present disclosure.

The selection window may be output on the display unit 251 of the HMD 200 on the basis of a user control command (for example, when the user gazes at a graphic object associated with a specific function, when a certain function is executed through the touch screen 151 (or the user input unit 223 of the HMD 200), or when the terminal body 100 or the HMD 200 is moved as a preset movement).

In a state in which the selection window 1300 is output, when the terminal body 100 is moved, the controller 180 may perform any one of two operations included in the selection window 1300 on the basis of a direction in which the terminal body 100 is moved.

For example, when the terminal body 100 is moved (or rotated) in a first direction 1320a, the controller 180 may perform a first operation (for example, an operation of selecting "YES").

Also, when the terminal body 100 is moved in a second direction different from the first direction, the controller 180 may perform a second operation (for example, an operation of selecting "NO") different from the first operation.

Also, when it is sensed that the HMD 200 is moved in the first direction 1320a) through the sensing unit 240 of the HMD 200, the controller 180 may perform the first operation (for example, the operation of selecting "YES").

Also, when it is sensed that the HMD 200 is moved in the second direction 1310b different from the first direction, the controller 180 may perform the second operation (for example, the operation of selecting "NO") different from the first operation.

In addition, on the basis of a user input (for example, a touch input) applied to the touch screen 151 (or the user input unit 223 of the HMD 200), the controller 180 may perform any one of the at least two operations.

Also, in a case in which the user gazes at any one of buttons corresponding to at least two operations included in the selection window (or in a case in which the user gazes at any one of the buttons for a period of time equal to or greater than a predetermined period of time or in a case in which the terminal body is moved as a preset movement while the user gazes at the any one button), an operation associated with the any one button may be performed.

As described above, according to the present disclosure, a user interface allowing for controlling the HMD 200 using the mobile terminal 100 in an optimized manner can be provided.

Also, in a state in which a certain region of a virtual space is output on the display unit 251 of the HMD 200, when the mobile terminal 100 is moved as a preset movement, a default region of the virtual space may be output on the display unit 251 of the HMD 200. Through this configuration, in the present disclosure, a user interface allowing for adjusting a screen output on the HMD 200 in an optimized manner can be provided.

Also, in the present disclosure, in a state in which a user input is applied to the mobile terminal 100, when the HMD 200 is moved, a screen (that is, a portion of a virtual space) output on the HMD 200 may be maintained. Thus, in the present disclosure, in a case in which the user who wears the HMD 200 wants to move in a state in which a currently output screen is maintained, a control method capable of more conveniently performing the corresponding operation can be provided.

Also, in the present disclosure, in a case in which an event occurs in the mobile terminal while the HMD 200 is being used, information related to the event may be output on the display unit 251 of the HMD 200 and an optimized control method for performing an operation (function) related to the event may be provided by using the mobile terminal 100.

In this disclosure, it is described that the HMD 200 is controlled through the controller 180 of the mobile terminal 100, but the present disclosure is not limited thereto and the controller 280 of the HMD 200 may perform controlling. For example, when the mobile terminal 100 connected in a wired manner is moved as a preset movement, the controller 280 of the HMD 200 may output a preset first region (for example, a default region) of the virtual space on the display unit 251 of the HMD 200. The contents described above with reference to FIGS. 6 through 13 may be inferred and applied in a manner that is the same as or similar to the above method.

Also, in the above, the state in which the mobile terminal 100 and the HMD 200 are connected in a wired manner is described as an example, but the present disclosure is not limited thereto. That is, in the present disclosure, the contents described above with reference to FIGS. 6 through 13 may be inferred and applied in the same or similar manner even in a case in which the mobile terminal 100 and the HMD 200 are connected wirelessly such that wireless communication can be performed through the wireless communication unit 110 of the mobile terminal 100 and the wireless communication unit of the HMD 200, as well as in the case in which the mobile terminal 100 and the HMD 200 are connected in a wired manner.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A system comprising:
a head mounted display (HMD) having a display and a sensing unit; and
a mobile terminal configured to be coupled to the HMD for controlling the HMD, wherein the mobile terminal comprises:
a terminal body;
an interface unit configured to couple with the HMD;
a sensing unit configured to sense movement of the terminal body; and
a controller configured to:
cause output of a preset first region of a virtual space on the display of the HMD;
cause output of a second region of the virtual space on the display, different from the preset first region, based on movement of the HMD sensed through the sensing unit of the HMD;
control the display of the HMD based on a movement of the mobile terminal;
cause output of the preset first region, instead of the second region, on the display of the HMD when the mobile terminal is moved as a preset movement without the movement of the HMD,
perform a first operation related to the HMD when the mobile terminal is moved in a first direction; and
perform a second operation related to the HMD different from the first operation when the mobile terminal is moved in a second direction different from the first direction.

2. The system of claim 1, wherein the controller is further configured to:
cause the output of the preset first region, instead of the second region, on the display of the HMD based upon the movement of the mobile terminal that corresponds to a preset movement, even when movement of the HMD is not sensed.

3. The system of claim 2, wherein the controller is further configured to:

rotate the virtual space with respect to the HMD such that the preset first region is output on the display of the HMD in response to the preset movement.

4. The system of claim 1, wherein the preset first region is at least one of a default region of the virtual space, a region including a specific object among objects included in the virtual space, or a specific region set by a user.

5. The system of claim 1, wherein the movement of the HMD is sensed using the sensing unit of the mobile terminal.

6. The system of claim 1, further comprising:
a wireless communication unit,
wherein the controller is further configured to:
cause the display of the HMD to display event information related to an event occurring in response to a signal received via the wireless communication unit.

7. The system of claim 6, wherein the controller is further configured to:
increase a size of one portion of the event information displayed on the display of the HMD when the HMD is rotated in a direction in which the event information is displayed.

8. The system of claim 6, wherein the controller is further configured to:
perform an operation related to the event when the terminal body is moved according to a specific movement while the event information is displayed.

9. The system of claim 1, wherein
the sensing unit of the HMD senses eyes of the user who wears the HMD and the virtual space includes at least one graphic object associated with a preset function, and wherein the controller is further configured to:
perform a function associated with a first one of the at least one graphic object when the sensing unit of the HMD senses that the user gazes at the first one of the at least one graphic object for a defined time period.

10. The system of claim 1, wherein the controller is further configured to:
cause the display of the HMD to display a selection window for selecting any one of at least two operations; and
perform any one of the at least two operations according to a direction in which the terminal body is moved while the selection window is displayed.

11. A system comprising:
a head mounted display (HMD) having a display, a sensing unit, and a user input unit; and
a mobile terminal configured to be coupled to the HMD for controlling the HMD, wherein the mobile terminal comprises:
an interface unit configured to couple with the HMD;
a touch screen; and
a controller configured to:
cause output of a first portion of a virtual space on the display of the HMD;
cause output of a second portion of the virtual space different from the first portion of the virtual space on the display of the HMD when the HMD is moved in a state in which a user input is not applied to the touch screen and the user input unit of the HMD; and
not change the first portion of the virtual space output to the display of the HMD when the HMD is moved in a state in which a user input is applied to the touch screen of the mobile terminal and the user input is maintained on the touch screen of the mobile terminal.

12. A method for controlling a system including a mobile terminal and a head mounted display (HMD), the method comprising:
outputting a preset first region of a virtual space on a display of the HMD;
outputting a second region of the virtual space on the display of the HMD, different from the preset first region, based on movement of the HMD sensed through a sensing unit of the HMD;
controlling the display of the HMD based on a movement of the mobile terminal;
outputting the preset first region, instead of the second region, on the display of the HMD when the mobile terminal is moved as a preset movement without the movement of the HMD,
performing a first operation related to the HMD when the mobile terminal is moved in a first direction; and
performing a second operation related to the HMD different from the first operation when the mobile terminal is moved in a second direction different from the first direction.

13. The method of claim 12, further comprising:
outputting the preset first region, instead of the second region, on the display of the HMD based upon the movement of the mobile terminal that corresponds to a preset movement, even when movement of the HMD is not sensed.

* * * * *